United States Patent
Shintani et al.

(10) Patent No.: US 11,010,609 B2
(45) Date of Patent: May 18, 2021

(54) MOBILE IMAGE PICKUP SYSTEM, LEARNING METHOD, MOBILE IMAGE PICKUP APPARATUS, INFORMATION ACQUISITION CONTROL APPARATUS, INFORMATION ACQUISITION CONTROL METHOD AND RECORDING MEDIUM STORING INFORMATION ACQUISITION CONTROL PROGRAM

(71) Applicant: Olympus Corporation, Hachioji (JP)

(72) Inventors: Koichi Shintani, Hachioji (JP); Kenji Homma, Sagamihara (JP); Akinobu Sato, Hachioji (JP); Yoshihisa Ogata, Hachioji (JP); Yoichi Yoshida, Inagi (JP); Kazuhiko Osa, Hachioji (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 120 days.

(21) Appl. No.: 16/292,234

(22) Filed: Mar. 4, 2019

(65) Prior Publication Data
US 2019/0286908 A1     Sep. 19, 2019

(30) Foreign Application Priority Data

Mar. 16, 2018 (JP) .............................. JP2018-049851

(51) Int. Cl.
*G06K 9/00* (2006.01)
*G06N 3/08* (2006.01)
*G06N 5/04* (2006.01)

(52) U.S. Cl.
CPC ..... *G06K 9/00671* (2013.01); *G06K 9/00677* (2013.01); *G06K 9/00691* (2013.01); *G06N 3/08* (2013.01); *G06N 5/04* (2013.01)

(58) Field of Classification Search
CPC .............................. H04N 5/232; G06N 20/00
USPC ...... 345/660; 348/222.1; 382/305, 306, 195, 382/190
See application file for complete search history.

(56) References Cited

U.S. PATENT DOCUMENTS

| | | | | |
|---|---|---|---|---|
| 2008/0079383 A1* | 4/2008 | Nakamoto | ........... | G05D 1/0251 318/587 |
| 2020/0047346 A1* | 2/2020 | Yang | ..................... | B25J 9/1664 |

FOREIGN PATENT DOCUMENTS

JP     2006-263844     10/2006

* cited by examiner

*Primary Examiner* — Kiet M Doan
(74) *Attorney, Agent, or Firm* — John C. Pokotylo; Pokotylo Patent Services

(57) ABSTRACT

A mobile image pickup instruction apparatus judges an image pickup result and an image pickup condition to acquire photographing tendency information showing a tendency of photographing of a predetermined image pickup target, generates target object identification information for identifying the predetermined image pickup target by inference using the photographing tendency information, and transmits the generated target object identification information to the mobile image pickup apparatus and a mobile image pickup apparatus controls an image pickup unit provided on a mobile body to pick up an image of the image pickup target based on the target object identification information received.

15 Claims, 13 Drawing Sheets

US 11,010,609 B2

MOBILE IMAGE PICKUP SYSTEM, LEARNING METHOD, MOBILE IMAGE PICKUP APPARATUS, INFORMATION ACQUISITION CONTROL APPARATUS, INFORMATION ACQUISITION CONTROL METHOD AND RECORDING MEDIUM STORING INFORMATION ACQUISITION CONTROL PROGRAM

CROSS REFERENCE TO RELATED APPLICATION

This application claims the benefit of Japanese Application No. 2018-049851 filed in Japan on Mar. 16, 2018, the contents of which are incorporated herein by this reference.

BACKGROUND OF THE INVENTION

1. Field of the Invention

The present invention relates to a mobile image pickup system enabling information acquisition by a robot configured to perform work, a learning method, a mobile image pickup apparatus, an information acquisition control apparatus, an information acquisition control method and a recording medium storing an information acquisition control program.

2. Description of the Related Art

Recently, not only industrial robots but also various robots for general household use that autonomously perform work, such as a commercialized robot vacuum cleaner, a drone, a bipedal robot and a dog type robot, have been used. Such robots are used for various purposes such as for activities in dangerous places, for activities in places that are difficult for persons to enter, or for a purpose of freeing persons from troublesome work, boring work and the like.

For example, in Japanese Patent Application Laid-Open Publication No. 2006-263844, a robot that moves according to a user's instruction is disclosed.

SUMMARY OF THE INVENTION

A mobile image pickup system according to an aspect of the present invention is a mobile image pickup system in which a mobile image pickup instruction apparatus and a mobile image pickup apparatus acquire an image of an image pickup target in cooperation, wherein the mobile image pickup instruction apparatus includes: a communication device; and a first processor, the first processor judging an image pickup result and an image pickup condition to acquire photographing tendency information showing a tendency of photographing of a predetermined image pickup target, generating target object identification information for identifying the predetermined image pickup target as an inference result by inference using the photographing tendency information, and transmitting the generated target object identification information to the mobile image pickup apparatus via the communication device; and the mobile image pickup apparatus includes: a mobile body; an image pickup unit provided on the mobile body; and a second processor, the second processor controlling the image pickup unit to pick up an image of the image pickup target based on the target object identification information received.

A learning method according to an aspect of the present invention includes steps of: pairing each of images that a user is thought to want to photograph and information accompanying the image into teacher data; and obtaining an inference model for inferring a situation that the user wants to photograph, by learning with the teacher data.

A mobile image pickup apparatus according to an aspect of the present invention includes: an image pickup unit provided on a mobile body; a communication device configured to perform communication with an external apparatus; and a processor, wherein the processor is given target object identification information for identifying a predetermined image pickup target from a mobile image pickup instruction apparatus, and performs movement control to cause the mobile body to move using map information so as to cause an image of an image pickup target specified by the target object identification information to be picked up by the image pickup unit and image pickup control to cause the image of the image pickup target to be picked up by the image pickup unit; the target object identification information is obtained as an inference result of inference using photographing tendency information; and the photographing tendency information shows a tendency of photographing of the predetermined image pickup target and is obtained by judgment of an image pickup result and an image pickup condition.

An information acquisition control apparatus according to an aspect of the present invention includes: a situation detection apparatus including: a sensor configured to detect a photographing time situation leading to a user's photographing action and detect an image pickup result which is a result of the photographing action; and a processor configured to output information about the detected photographing time situation and the detected image pickup result; wherein the processor acquires an inference model by an inference process according to photographing tendency information indicating a relationship between the photographing time situation and the image pickup result that the situation detection apparatus detects, and generates and outputs target object identification information for identifying an image pickup target, using the inference model.

An information acquisition control method according to an aspect of the present invention includes steps of: detecting a photographing time situation leading to a user's photographing action, detecting an image pickup result which is a result of the photographing action, and outputting information about the detected photographing time situation and the detected image pickup result; acquiring an inference model by an inference process according to photographing tendency information indicating a relationship between the photographing time situation and the image pickup result; and generating and outputting target object identification information for identifying an image pickup target, using the inference model.

A recording medium storing an information acquisition control program according to an aspect of the present invention stores the information acquisition control program for causing a computer to execute a procedure for: detecting a photographing time situation leading to a user's photographing action, detecting an image pickup result which is a result of the photographing action, and outputting information about the detected photographing time situation and the detected image pickup result; acquiring an inference model by an inference process according to photographing tendency information indicating a relationship between the photographing time situation and the image pickup result;

and generating and outputting target object identification information for identifying an image pickup target, using the inference model.

BRIEF DESCRIPTION OF THE DRAWINGS

FIG. 2 relates to a second embodiment of the present invention and is an explanatory diagram showing an example in which the information acquisition apparatus 20 in FIG. 1 is applied to a cell observation apparatus 20a.

DETAILED DESCRIPTION OF THE PREFERRED EMBODIMENT(S)

Embodiments of the present invention will be described below in detail with reference to drawings.

First Embodiment

Proposals of a robot that is caused to move by being provided with a target position are well known. In the future, however, it is required that apparatuses execute what a user requests in cooperation. That is, how control of a robot in consideration of a user's intention is performed without a detailed program or detailed manipulation will be an issue.

The present invention adopts a configuration shown below in order to provide a robot for image pickup that can enable information acquisition satisfying a particular condition in a particular situation.

Figure 1:
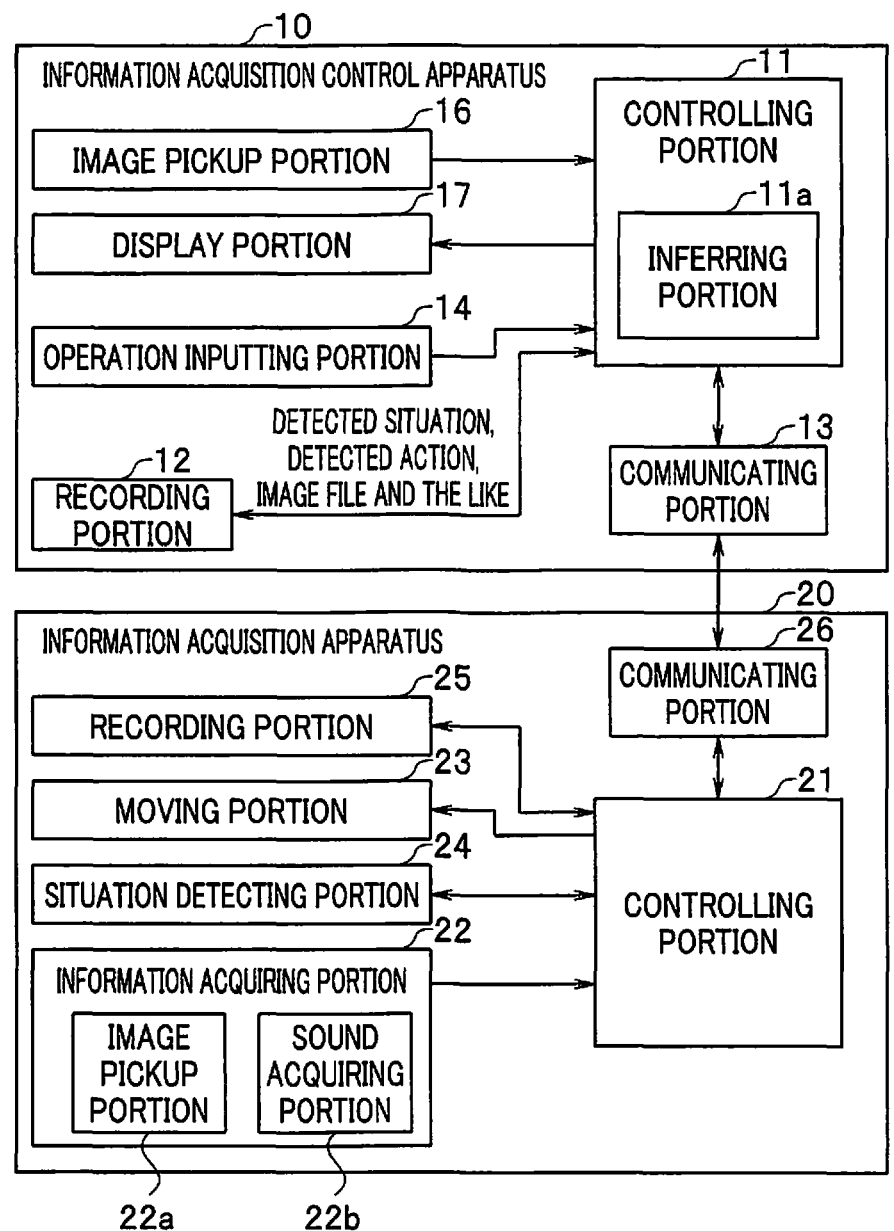
FIG. 1 is a block diagram showing an information acquisition control apparatus 10 and an information acquisition apparatus 20 according to a first embodiment of the present invention.

FIG. 1 is a block diagram showing an information acquisition control apparatus 10 and an information acquisition apparatus 20 according to a first embodiment of the present invention. In the present embodiment, a situation leading to a user's action, for example, an action of photographing or sound acquisition or an action of reproducing an image or sound acquired by the action (hereinafter referred to as a detected situation) and the action itself (hereinafter referred to as a detected action) are detected by various sensors; a condition in a case of causing the information acquisition apparatus 20 using a robot and the like to acquire information by learning of the detected situation and the detected action that have been detected (hereinafter referred to as an information acquisition condition) is determined; and the information acquisition condition is specified to the information acquisition apparatus 20.

For example, when it is assumed that a certain user performs photographing with predetermined photographing parameters at a predetermined place at predetermined time, a detected situation of the predetermined time and the predetermined place and a detected action of performing photographing with the predetermined photographing parameters are detected. Then, by learning of the detected situation and the detected action, an information acquisition condition of performing photographing with the particular photographing parameters at the particular time at the particular place is set. Then, by following the information acquisition condition, the information acquisition apparatus 20 acquires information of a picked-up image. That is, it becomes possible for the information acquisition apparatus 20 to automatically acquire information that the user desires in place of the user.

For example, by the user performing image pickup, image pickup history information about the user can be obtained. Furthermore, when it is taken into account to acquire information about picked-up images disclosed on public servers on the Internet or the like by an unspecified large number of users, the image pickup history information may be said to be photographing tendency information showing a tendency of photographing. Such photographing tendency information is obtained by judging image pickup results of the user performing photographing of a predetermined image pickup target and conditions at the time of the image pickup (image pickup conditions). It is also possible to perform inference using the photographing tendency information and, as a result of the inference, acquire target object identification information identifying the image pickup target. By acquiring the target object identification information as an information acquisition condition, a mobile image pickup system utilizing a robot can be provided.

A mobile body such as a robot is provided with an image pickup portion. If target object identification information for identifying an image pickup target is given to a controlling portion of the robot from a mobile image pickup instruction apparatus, the robot can detect the specified target object by image analysis of picked-up images of surroundings of the mobile body and cause an image of the image pickup target to be picked up. At this time, the controlling portion of the robot may perform movement control to cause the robot to move to a necessary (identified) position by moving/traveling means in order to cause an image of the detected target object to be picked up by the image pickup portion. The mobile image pickup instruction apparatus (which may be built in instead of being a separate body) has a target object identification information generating portion, and the target object identification information generating portion generates the above target object identification information according to an inference result according to the user's image pickup history information and transmits the target object identification information to the mobile image pickup instruction apparatus.

The "predetermined time" described above may be a currently detected situation indicating that it is better to perform photographing because of "such a situation" or may be a detected situation in the future because there may be a case where it is desired to get ready for photographing according to a situation that is likely to occur in the future, the situation being inferred from analysis of situations from the past to the present. However, though the automatic acquisition is useful when the user cannot actually perform the action himself/herself, it is not possible to respond to the user's needs on the contrary if the automatic acquisition is performed when the user is going to perform the action himself/herself. That is, it is important to assist an action that the user cannot execute himself/herself, and, as for the assistance, a request or a prohibition order may be issued, or, a state of the user, such as the user being far away or being sleeping may be detected to give the assistance taking into account the state. This is not limited to the present embodiment, but the same goes for all embodiments. There may be a case where situation judgment is unsuitable for an apparatus to perform automatic acquisition, due to specifications. In such a case, since execution is impossible even if needs are taken into account, the situation judgment does not have to be performed in the first place. It is also possible to request the situation judgment from another compatible apparatus. In the present embodiment, such a special situation is not especially described in detail.

Note that there may be a case where an action of next photographing is determined according to an image obtained as a result of photographing by the user. An image obtained by an action can be used as information for obtaining a detected situation. That is, there may be a case where an image pickup condition at the time of image pickup is not required to obtain photographing tendency information (image pickup history information), and there may be a case where the photographing tendency information can be acquired by only an image which is an image pickup result obtained by an action. Therefore, it is assumed that an image (an image pickup result) or sound obtained by an action is treated as detected situation information.

Note that, though description will be made mainly on acquisition of an image in description below, the present embodiment is similarly applicable to sound.

In FIG. 1, the information acquisition apparatus 20 is provided with a controlling portion 21. The controlling portion 21 may be configured with a processor using a CPU (central processing unit), an FPGA (field-programmable gate may) or the like, or may be operated according to a program stored in a memory not shown to control each portion, or may be a hardware electronic circuit configured to realize a part or all of functions.

The information acquisition apparatus 20 is provided with an information acquiring portion 22. The information acquiring portion 22 is provided with an image pickup portion 22a. The image pickup portion 22a is provided with an image pickup device not shown, which is configured with a CCD or CMOS sensor, and an optical image of an object is led to an image pickup surface of the image pickup device by an optical system not shown. The image pickup portion 22a is capable of photoelectrically converting the optical image of the object to acquire a picked-up image (an image pickup signal) of the object. The information acquiring portion 22 is also provided with a sound acquiring portion 22b. The sound acquiring portion 22b is capable of acquiring sound around the information acquiring portion 22 to acquire a sound signal.

Though description of the image pickup portion 22a and the sound acquiring portion 22b is made mainly on an image or sound that the user wants to acquire, in order to clarify the image of the embodiment here, there are images obtained using ultraviolet rays or infrared rays or images obtained using X rays, and a technique of obtaining an image from characteristics of refraction and the like of sound waves or ultrasound waves is also known. In order to respond to such images and sound, sensors for wavelengths of lights, radiation, frequencies of sounds and the like may be provided as necessary.

The information acquisition apparatus 20 is provided with a moving portion 23. The moving portion 23 is provided with a mechanism not shown, the mechanism being configured to cause a state of information acquisition of the information acquiring portion 22 to change. For example, the moving portion 23 is adapted to be capable of causing a position of the image pickup portion 22a to move and causing a direction of image pickup by the image pickup portion 22a to change. The moving portion 23 may be adapted to be capable of, by causing the information acquisition apparatus 20 itself to move, changing a direction of information acquisition by the information acquiring portion 22 and a position to acquire information.

For example, if the information acquisition apparatus 20 uses a robot vacuum cleaner or the like, the moving portion 23 has wheels as a moving mechanism. If the information acquisition apparatus 20 uses a drone, the moving portion 23 has a propeller as a moving mechanism. As the information acquisition apparatus 20, a robot which moves by legs may be adopted, or a robot which moves by caterpillars may be adopted. Note that it is assumed that the moving portion 23 includes a driving mechanism such as a motor or an engine to drive the moving mechanism. The moving portion 23 can be controlled by the controlling portion 21 to cause the information acquisition apparatus 20 to move in a desired direction.

In some cases, the controlling portion 21 controls the moving portion 23 so that the state of information acquisition by the information acquiring portion 22 meets an information acquisition condition. In some cases, as a result of the state of information acquisition by the information acquiring portion 22 being changed by the moving portion 23, the state of information acquisition meets the information acquisition condition. In any of the cases, the controlling portion 21 causes the information acquiring portion 22 to acquire information according to an information acquisition condition if the state of information acquisition by the information acquiring portion 22 meets the information acquisition condition.

The information acquisition condition is generated based on a detected situation and a detected action and is information of the same kind as the information of the detected situation and the detected action. For example, as the detected situation, the detected action and the information acquisition condition, information (information about an image pickup condition) such as a target to be photographed, an environment of photographing (temperature, humidity, pressure and the like), time of photographing, a position of photographing, an angle of view for photographing, and various video parameters at the time of performing photographing are conceivable if information to be acquired is an image. The information acquisition condition is generated based on a detected situation and a detected action by the information acquisition control apparatus 10 to be described later.

The information acquisition apparatus 20 is provided with a situation detecting portion 24 for detecting a detected situation and a detected action (for example, an image pickup result and an image pickup condition). The situation detecting portion 24, which is a situation detection device, is configured with a processor using various sensors, a CPU and the like not shown and detects detected situations leading the user to various actions and detected actions that are the various actions themselves. Note that it is assumed that the various sensors that the situation detecting portion 24 has include a device configured to detect information about time. The situation detecting portion 24 is adapted to be capable of, if the user's action is, for example, photographing, detecting a target to be photographed, an environment of photographing, time of photographing, a position of photographing, an angle of view for photographing, and various video parameters at the time of performing photographing and the like as described above. The situation detecting portion 24 outputs a detection result to the controlling portion 21 as information about a detected situation and a detected action. Note that, as described above, information itself acquired by the information acquiring portion 22 is included in the information about the detected situation.

The information acquisition apparatus 20 is also provided with a recording portion 25. The recording portion 25 is configured with a predetermined recording medium such as a memory or a hard disk and is adapted to be controlled by the controlling portion 21 to be given information acquired by the information acquiring portion 22 and record the information. Note that the situation detecting portion 24 is adapted to be capable of acquiring not only a detected situation and a detected action at the time of information acquisition by the information acquiring portion 22 but also a detected situation and a detected action at the time of reproducing information recorded in the recording portion 25 to output the detected situation and the detected action to the controlling portion 21.

The information acquisition apparatus 20 is provided with a communicating portion 26. The communicating portion 26 can be controlled by the controlling portion 21 to perform communication with an external apparatus to transmit and receive information. The controlling portion 21 can transmit information about a detected situation and a detected action detected by the situation detecting portion 24 to the information acquisition control apparatus 10 via the communicating portion 26 and receive information about an information acquisition condition transmitted from the information acquisition control apparatus 10 via the communicating portion 26.

The information acquisition control apparatus 10 is provided with a controlling portion 11. The controlling portion 11 may be configured with a processor using a CPU, an FPGA or the like, or may be operated according to a program stored in a memory not shown to control each portion, or may be a hardware electronic circuit configured to realize a part or all of functions. The information acquisition control apparatus 10 has a communicating portion 13. The communicating portion 13 can be controlled by the controlling portion 11 to perform communication with an external apparatus to transmit and receive information. The controlling portion 11 can receive information about a detected situation and a detected action transmitted from the communicating portion 26 of the information acquisition apparatus 20, via the communicating portion 13 and cause information about an information acquisition condition generated by an inferring portion 11a to be described later to be transmitted to the controlling portion 21 of the information acquisition apparatus 20 via the communicating portions 13 and 26.

The information acquisition control apparatus 10 has a recording portion 12. The recording portion 12 is configured with a predetermined recording medium such as a memory or a hard disk and is controlled by the controlling portion 11 so that the information about a detected situation and a detected action received via the communicating portion 13 is recorded.

The controlling portion 11 is provided with an inferring portion 11a. The inferring portion 11a constitutes artificial intelligence to realize machine learning, depth learning and the like and performs inference using the artificial intelligence. The inferring portion 11a is capable of reading a large amount of information about detected situations and detected actions recorded in the recording portion 12, performing learning, and determining an information acquisition condition as a result of inference. For example, if information about time and position of photographing by the user is given as information about a detected situation, and information about a detected action of performing photographing with predetermined photographing parameters is given, the inferring portion 11a determines information that photographing is to be performed at the particular photographing time and the particular photographing position with the particular photographing parameters as information about an information acquisition condition. Note that target object identification information for identifying an image pickup target is also included in the information acquisition condition.

For example, if an image obtained by the user photographing a predetermined object is given as information about a detected situation, the inferring portion 11a can identify the object by image recognition processing of the image and determine information for identifying the object as information about an information acquisition condition. For example, it is also possible to, when changing series of images are given as information about a detected situation, and information about a detected action of performing photographing at a predetermined image conversion timing is given, determine an information acquisition condition that photographing is to be performed at a timing when an image in a particular change state is obtained. Though the term of "photographing" is used here, an expression of "image pickup" may be used because the purpose is not limited only to photographing of a still image or movie but may be only observing or appreciating an image. As the information, any data is possible if the data can be acquired by various sensors. A microphone, a sound acquisition circuit and the like to detect a sound are typical examples of the sensors. What can be detected by human five senses may be acquired by sensors in place of the human five senses. What cannot be perceived by human beings, such as ultrasound waves, infrared rays and ultraviolet rays may be acquired by dedicated sensors.

The controlling portion 11 is capable of giving information about an information acquisition condition determined by the inferring portion 11a to the controlling portion 21 of the information acquisition apparatus 20 via the communicating portions 13 and 26.

Note that the information acquisition control apparatus 10 is provided with an image pickup portion 16 and a display portion 17. The image pickup portion 16 is provided with an image pickup device not shown, which is configured with a CCD or a CMOS sensor, and an optical image of an object is led to an image pickup surface of the image pickup device by an optical system not shown. The display portion 17 includes a display screen configured with an LCD or the like and is capable of displaying a given picked-up image on the display screen.

The information acquisition control apparatus 10 is provided with an operation inputting portion 14. The operation inputting portion 14 can be configured with a keyboard, a touch panel or the like, not shown. The operation inputting portion 14 accepts a user operation and generates an operation signal based on the user operation. Note that a touch panel provided on the display screen of the display portion 17, which is not shown, may be adopted as the operation inputting portion 14. The touch panel is capable of generating an operation signal corresponding to a position on the display screen the user touched with a finger. The operation signal from the operation inputting portion 14 is supplied to the controlling portion 11. The controlling portion 11 controls each portion according to the operation signal.

Here, a clock may be built in or referred to. Data about at which timing and how often a user operation is performed may be acquired in association with content of the operation and a time judgment result such as a season, day or night, time and a cycle so that the data can be examined. It is also possible to judge a character input result, a search result and the like. A condition and the like at the time of the user using the information acquisition apparatus 20 may be judged from the input result. A detection function similar to the detection function of the situation detecting portion 24 of the information acquisition apparatus 20 may be provided, or it may be enabled to refer to outputs from sensors different from the sensors of the situation detecting portion 24 so that factors other than time, a keyboard operation or a touch operation at the time of an operation being performed may be judged. Of course, a sensor or the like to perform personal authentication and the like for an operator such as fingerprint authentication or face detection, or a device to read an IC tag, a barcode or the like may be provided so that work assistance and the like taking into account customization and security can be performed from an authentication result. The user's gesture and words may be analyzed from an image inputted by a camera for a user monitor and sound inputted by a microphone to infer or read the user's intention. Note that, according to an embodiment or a system design, the information acquisition apparatus 20 may be provided with such a function, or information may be shared and used in common among apparatuses. The user targeted by "inference of the intention" described above is not limited to a particular individual but may include persons having similar profiles. If there is a tendency that "a general person would do so", a larger range of persons may be included. The target user is determined depending on how the "intention" is to be reflected.

In the example in FIG. 1, the information acquisition control apparatus 10 as a mobile image pickup instruction apparatus is capable of controlling movement and information acquisition of the information acquisition apparatus 20 as a mobile image pickup apparatus. The user is able to perform an operation for controlling movement and information acquisition of the information acquisition apparatus 20 by the operation inputting portion 14, and the controlling portion 11 of the information acquisition control apparatus 10 can transmit control information for controlling movement and information acquisition of the information acquisition control apparatus 10 to the controlling portion 21 via the communicating portions 13 and 26 based on the user operation. The controlling portion 21 is capable of controlling the moving portion 23 and the situation detecting portion 24 based on the control information to acquire information under a desired condition.

In the embodiment configured as described above, for example, the user operates the operation inputting portion 14 to control movement and information acquisition of the information acquisition apparatus 20. For example, it is assumed that a smartphone is adopted as the information acquisition control apparatus 10, and a robot having an image pickup function is adopted as the information acquisition apparatus 20. The user performs an operation of controlling photographing by the robot using a touch panel or the like of the smartphone as the operation inputting portion 14. It is assumed that, by the operation, the robot constituting the information acquisition control apparatus 10 picks up an image of an object, for example, with predetermined photographing parameters at predetermined time at a predetermined position.

The situation detecting portion 24 detects a detected situation leading to such a photographing operation by the user and a detected action at the time of photographing. For example, in this case, the situation detecting portion 24 obtains photographing time, a photographing position and information about an object as the detected situation and obtains information about the detected action of performing photographing with the predetermined photographing parameters. The information about the detected situation and the detected action acquired by the situation detecting portion 24 is given to the controlling portion 21. The controlling portion 21 transmits the information about the detected situation and the detected action detected by the situation detecting portion 24 to the controlling portion 11 of the information acquisition control apparatus 10 via the communicating portions 26 and 13.

The controlling portion 11 sequentially gives received pieces of information about detected situations and detected actions to the recording portion 12 to record the information. The controlling portion 11 performs inference by machine learning, depth learning and the like of the recorded pieces of information about the detected situations and the detected actions to determine an information acquisition condition that the user is thought to desire. For example, based on the sequentially recorded pieces of information about the detected situations and the detected actions, the controlling portion 11 infers an information acquisition condition that the user desires image pickup of an object with particular photographing parameters at particular time at a particular position. The controlling portion 11 outputs information about the information acquisition condition obtained by the inference to the controlling portion 21 via the communicating portions 13 and 26.

The learning is to, using the recorded pieces of information and conditions under which the pieces of recorded information have been obtained as teacher data, obtain a model (a learned model) to infer that a particular image is obtained under a particular condition. An individual who uses the system described here itself may be regarded as a user (a user in a narrow sense), or general persons having similar needs may be generically called a user (a user in a broad sense). In order to detect or acquire information related to a situation detected before such a user in the narrow or broad sense has been led to an image pickup action and the image pickup action by the user (it is possible to detect the information each time, or it is possible to read the information which has already been detected and recorded), the situation detecting portion 24 is provided. In this way, a relationship between a situation and an action can be machine-learned and modeled according to the user's image pickup history. That is, an inference result obtained here is obtained by an inference model learned based on the information from the situation detecting portion 24. For example, since the inference model is learned so that, with a particular date and time itself or a situation at that time as an input, target object identification information (an information acquisition condition) in the situation is outputted, a target object that the user or a general user wants to pick up an image of can be determined according to each occasion. Of course, it is enabled to output whether inference reliability is low or not. If reliability of target object identification information in the situation is low, it is unnecessary to perform image pickup.

When an information acquisition condition is given, the controlling portion 21 controls the moving portion 23 and the situation detecting portion 24 according to the information acquisition condition to acquire information. That is, in this case, the controlling portion 21 controls the moving portion 23 to cause the situation detecting portion 24 to be positioned at a particular position and causes an image of an object corresponding to particular time to be picked up with particular video parameters by the situation detecting portion 24 regardless of a user operation.

As described above, in the present embodiment, a detected situation that leads the user to an action and the action (a detected action) are detected by various sensors. The controlling portion 11 of the information acquisition control apparatus 10 determines an information acquisition condition that the user is thought to desire, by learning of the detected situation and the detected action that have been detected, and transmits information about the information acquisition condition to the information acquisition apparatus 20. The information acquisition apparatus 20 thereby performs information acquisition according to the information acquisition condition. Thus, information acquisition is automatically performed according to an information acquisition condition that the user desires, without the user being conscious of the information acquisition.

Note that though the example in FIG. 1 shows an example in which the situation detecting portion 24 is built in the information acquisition apparatus 20, the situation detecting portion 24 may be provided outside the information acquisition apparatus 20 or may be provided in the information acquisition control apparatus 10. The information acquisition control apparatus 10 may use the image pickup portion 16 as a situation detecting portion. A processor constituting the situation detecting portion 24 and a processor constituting the controlling portion 11 or the controlling portion 21 may be the same. Though the example in FIG. 1 shows an example in which information acquisition according to an information acquisition condition is performed in the information acquisition apparatus 20 to detect a detected situation and a detected action, an apparatus to acquire a detected situation and a detected action and an apparatus to acquire information according to an information acquisition condition may be mutually different apparatuses.

Though, in the example in FIG. 1, it is described that the controlling portion 21 of the information acquisition apparatus 20 acquires information according to an information acquisition condition, it is also possible for the controlling portion 11 of the information acquisition control apparatus 10 to determine control information for controlling the information acquisition apparatus 20 based on an information acquisition condition obtained as a result of inference and give the control information to the controlling portion 21 to control information acquisition. Therefore, it is possible to, as the information acquisition apparatus 20 in FIG. 1, adopt a remote-controllable apparatus having an information acquisition function.

That is, each of the process for acquiring a detected situation and a detected action (an acquisition process), the process for inferring an information acquisition condition from the detected situation and the detected action that have been acquired (an inference process) and the process for controlling information acquisition based on the inferred information acquisition condition (an acquisition control process) may be performed by either the information acquisition control apparatus 10 or the information acquisition apparatus 20, or may be performed, being shared in cooperation between the apparatuses or may be entrusted to another external apparatus.

An inference model to perform inference here assumes a product obtained by learning with teacher data obtained by pairing information such as an image that the user is thought to want to acquire and accompanying information accompanying the acquired information. The inference model makes an inference that "the user must want such information in such a situation". As for the information that the user is thought to want to acquire, it is better to further select information that can be acquired from information about performance, functions and an installation environment of the information acquisition apparatus 20 and reflect the information at the time of performing inference. By doing so, it becomes possible for the information acquisition apparatus 20 to perform reasonable information acquisition without performing a useless operation that the information acquisition apparatus 20 is not good at. Some way such as transmitting a warning to the user if information acquisition is impossible may be devised.

Second Embodiment

Figure 2:
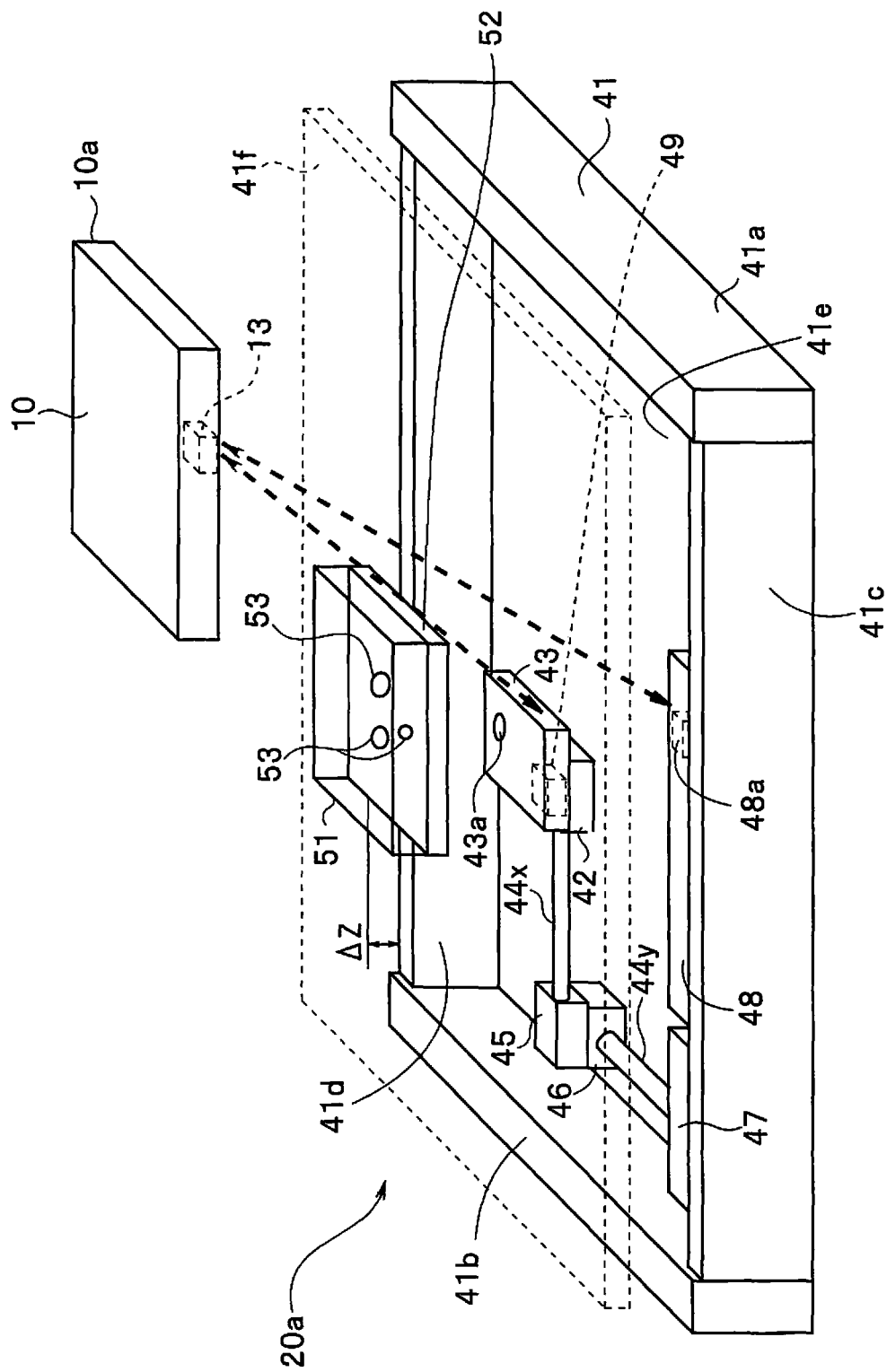

FIG. 2 relates to a second embodiment of the present invention and is an explanatory diagram showing an example of applying the information acquisition apparatus 20 in FIG. 1 to a cell observation apparatus 20a.

In FIG. 2, the cell observation apparatus 20a is a mobile image pickup apparatus (a working robot) to acquire image information about an observation target. In a case 10a, each of circuits constituting the information acquisition control apparatus 10 in FIG. 1 is stored. An observation target of the cell observation apparatus 20a is a sample in a culture vessel 51 such as a laboratory dish. Though the culture vessel 51 is a box body, the bottom plate of which is square and the upper part of which is open in FIG. 2, the shape of the bottom plate may be a circle or any other shape. Since a position to be observed changes according to the vessel shape, the vessel shape may be inputted by the operation inputting portion 14 or the situation detecting portion 24 or may be automatically judged. Since control may be switched by detecting the vessel shape as a situation, the vessel shape may be set as input information for the inference process. A culture medium 52 is formed on the bottom plate of the culture vessel 51. Cells 53 are cultured on the culture medium 52.

The cell observation apparatus 20a has a case 41 in which components except the sound acquiring portion 22b and the recording portion 25 of FIG. 1 are stored. The case 41 adopts a sealed structure so that the apparatus is not influenced under an environment with a high humidity and a relatively high temperature where culture is performed. Four sides are surrounded by side plates 41a to 41d, and a bottom plate 41e is arranged on a bottom face. Since a top face is in a direction in which the culture vessel is placed, a transparent plate 41f is arranged so that observation can be performed from the apparatus. Thus, the case 41 has a box shape sealed by the side plates 41a to 41d, the bottom plate 41e and the transparent plate 41f. Note that though FIG. 2 shows a state in which the transparent plate 41f is separated from the side plates 41a to 41d by a space, taking into account that the drawing is easy to see, the case 41 is actually structured such that the transparent plate 41f is in contact with the side plates 41a to 41d to seal an inside of the case 41. Note that all or a part of the recording portion 25 may be accommodated in the case 41, or the recording portion 25 may be externally expandable according to workability.

In the case 41, a camera device 43 fitted to a camera base 42 is stored. The camera device 43 corresponds to the information acquiring portion 22, the controlling portion 21 and the communicating portion 26 except the sound acquiring portion 22b in FIG. 1. In the case 41, an x feed screw 44x for causing the camera device 43 to move forward or backward in an x direction, and a y feed screw 44y for causing the camera device 43 to move forward or backward in a y direction. One end of the x feed screw 44x is turnably supported by a support member 45, and the other end is screwed in a screw hole in the camera base 42, which is not shown. By the x feed screw 44x turning, the camera base 42 can freely move forward or backward in the x direction. One end of the y feed screw 44y is turnably supported by a support member 47, and the other end is screwed in a screw hole in a moving member 46, which is not shown, the support member 45 being fixed to the moving member 46. By the y feed screw 44y turning, the moving member 46 can freely move forward or backward in the y direction. Therefore, it is possible to, by appropriately causing the x and y feed screws 44x and 44y to turn, cause the camera base 42 to move to an arbitrary position in the x or y direction.

The x and y feed screws 44x and 44y are turned by two motors not shown, respectively, and a movement controlling circuit 48 can drive the two motors. The moving portion 23 in FIG. 1 is configured with a moving mechanism of the camera base 42 including the movement controlling circuit 48. Note that the scanning mechanism configured to change a position can be changed to various systems. A system using a belt for movement is possible, or a system in which movement is performed by a motor along a rail is also possible.

The movement controlling circuit 48 is controlled by the information acquisition control apparatus 10. The movement controlling circuit 48 has a communicating portion 48a corresponding to the communicating portion 26 of FIG. 1, and the movement controlling circuit 48 is given control information for causing the camera device 43 to move, from the controlling portion 11 of the information acquisition control apparatus 10 via the communicating portions 48a and 13. Thus, the movement controlling circuit 48 is capable of causing the camera device 43 to move according to control by the information acquisition control apparatus 10.

Note that the movement controlling circuit 48 may be adapted to have a memory to store information for movement control of the camera device 43 (movement control information), cause the movement control information to be stored into the memory in advance, and perform movement control of the camera device 43 according to the movement control information.

The camera device 43 constituting the image pickup portion 22a of the information acquiring portion 22 of FIG. 1 has an optical system 43a configured to capture light incident via the transparent plate 41f, and the image pickup device not shown is provided at an image forming position on the optical system 43a. The optical system 43a has a focus lens that can be moved to set a focused state, a zoom lens configured to change magnification in the focused state and the like (not shown). Note that the camera device 43 has a mechanism portion not shown, which is configured to drive the lenses and apertures in the optical system 43a.

In the present embodiment, the culture vessel 51 can be placed on the transparent plate 41f. A size of the transparent plate 41f, that is, a size of the case 41 can be any size, for example, if the culture vessel 51 can be placed on the transparent plate 41f. Though FIG. 2 shows an example in which the size of the transparent plate 41f is larger than a size of the culture vessel 51, the case 41 can be configured with a size similar to the size of the culture vessel 51 and can be configured, for example, with a size and weight similar to a size and weight of a smartphone or the like that is excellent in portability.

In the present embodiment, the culture vessel 51 may be adapted so that the culture vessel 51 can be fixedly arranged on the transparent plate 41f by a support member not shown. If the case 41 has a sealed structure and is small-sized, the case 41 can withstand handling such as cleaning and can be treated as if the case 41 were integrated with the culture vessel 51.

The camera device 43 can acquire a picked-up image of the cells 53 in the culture vessel 51 placed on the transparent plate 41f. If the culture vessel 51 is fixedly arranged on the transparent plate 41f, a positional relationship between the transparent plate 41f and the culture vessel 51 does not change even if the case 41 is inclined. Therefore, since, for example, even in a case of performing work of inclining the culture vessel 51 together with the case 41 in a clean bench, a positional relationship between the culture vessel 51 in the state of being fixed on the transparent plate 41f and the optical system 43a of the camera device 43 does not change, a position of the camera device 43 in the x and y directions and the focused state do not change, and it is possible to continuously observe the state of a same cell by performing control such as fixing the camera device 43.

Note that an angle of view of the camera device 43 is extremely narrow to observe the state of the cells 53, and, therefore, it is necessary to perform photographing, causing the camera device 43 to move, in order to observe the whole culture medium 52.

The camera device 43 is provided with a communicating portion 49 corresponding to the communicating portion 26 of FIG. 1 and is capable of transmitting a picked-up image of the cells and the like obtained by performing image pickup to the information acquisition control apparatus 10 outside the case 41 via the communicating portions 49 and 13. Of course, such an application that a display panel is provided on the case portion to display the image pickup result here is also conceivable. The camera device 43 is given control information from the information acquisition control apparatus 10 via the communicating portions 13 and 49 and can perform photographing with photographing parameters according to the control information at a photographing timing according to the control information. The controlling portion 21 constituting the camera device 43 may be adapted to be capable of, when an information acquisition condition is given, performing photographing according to the information acquisition condition.

That is, in the embodiment in FIG. 2, at least the acquisition process and the inference process among the respective processes of the acquisition process, the inference process and the acquisition control process described above, are performed in the information acquisition control apparatus 10.

In such an example, as a situation detected before the user's image pickup action is led, not only a time period from start of culture of the cells, a vessel size and a culture medium (information about the kind and exchange) and culture conditions including a position, temperature, humidity and the like in an incubator but also a condition specific to the user to which the user attaches importance are assumed. These may be read not only from information about the incubator but also, for example, from text information inputted with a PC or the like, IC tags, barcodes and the like attached to the vessel and instruments. These are detected by the situation detecting portion 24, and a situation to acquire information related to the image pickup action is judged. The detection may be performed by communicating with each apparatus constituting the system each time, or what have been detected and recorded may be read. That is, by using such an inference engine that outputs an information acquisition condition including target object identification information at a timing, such as at a particular date and time, based on the timing itself and a situation at the timing, image pickup and observation at a timing that a researcher has forgotten or in a situation that the researcher does not notice becomes possible. An image pickup result may be transferred somewhere, or may be recorded so that a file of the image pickup result may be transferred. There may be a case where each researcher especially attaches much importance to something or a case where the researcher is a beginner. As for an inference result according to the user's image pickup history, an action of a user in the narrow sense in the former case and an action of a user in the broad sense (which can be read from theses published by a lot of researchers) in the latter case are used as a result acquired from the situation detecting portion 24. At which photographing timing, at which photographing position each user performs photographing, and the like are inferred by an inference model learned as described above.

The "timing that the researcher has forgotten" described above may be judged by a currently detected situation that "it is better to perform photographing now because the current situation is such", or may be a situation that is thought to occur in the future from an analysis of the current situation made by judging that the researcher has not come to his/her laboratory by illumination or room entry management or by judging that the researcher has not logged in his/her PC. It is, thereby, possible to solve a problem that unnecessary automatic acquisition is performed when a user is actually going to do an action himself/herself. That is, though it is important to assist an action that a user cannot execute himself/herself, judgment from combination of other pieces of information is also possible, or the user's manual settings may be adopted. Here, a use case is limited to the particular use case of observation of cells to avoid cases unsuitable for an automatic acquisition apparatus (here, magnified observation of an inside of a particular vessel, such as observation of cells) due to specifications.

Figure 3:
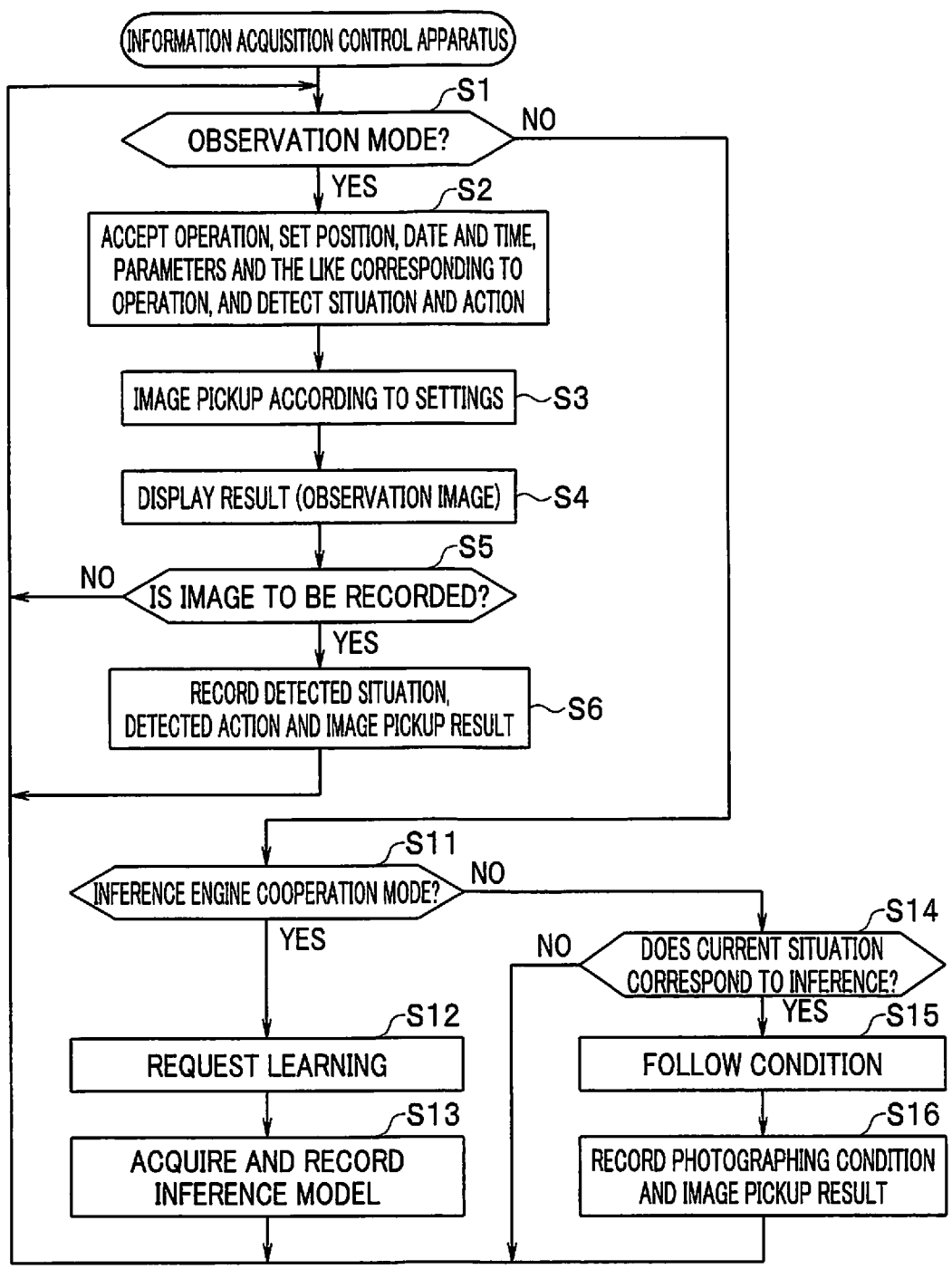
FIG. 3 is a flowchart showing an operation flow of the information acquisition control apparatus 10.
Figure 4:
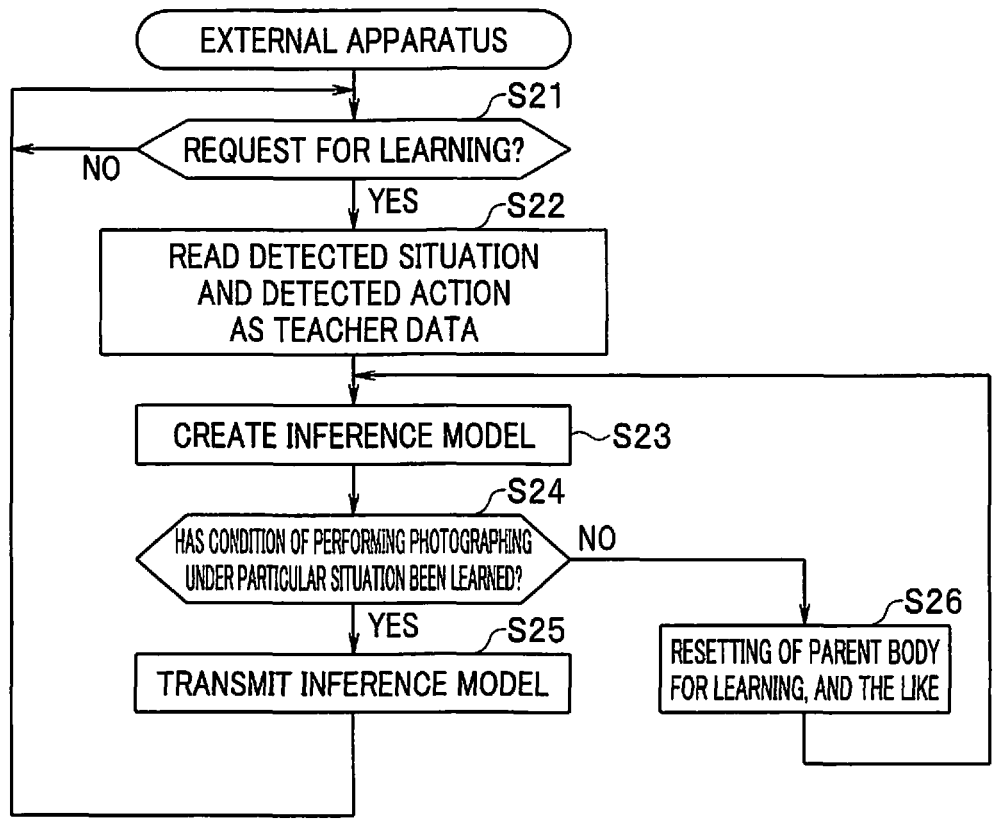
FIG. 4 is a flowchart showing an operation flow of an external server.
Figure 5:
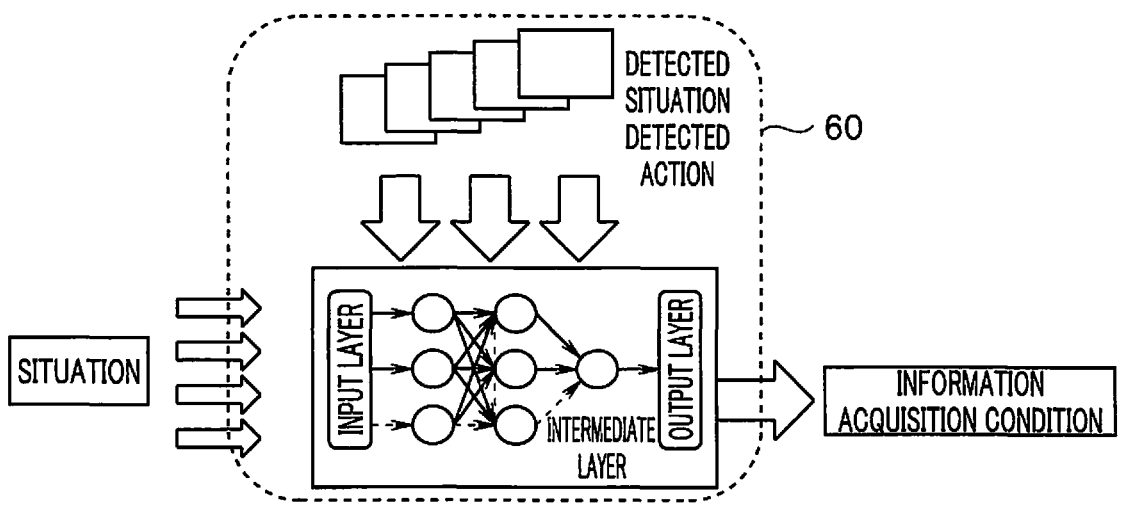
FIG. 5 is an explanatory diagram for illustrating an outline of an inference process.
Figure 6:
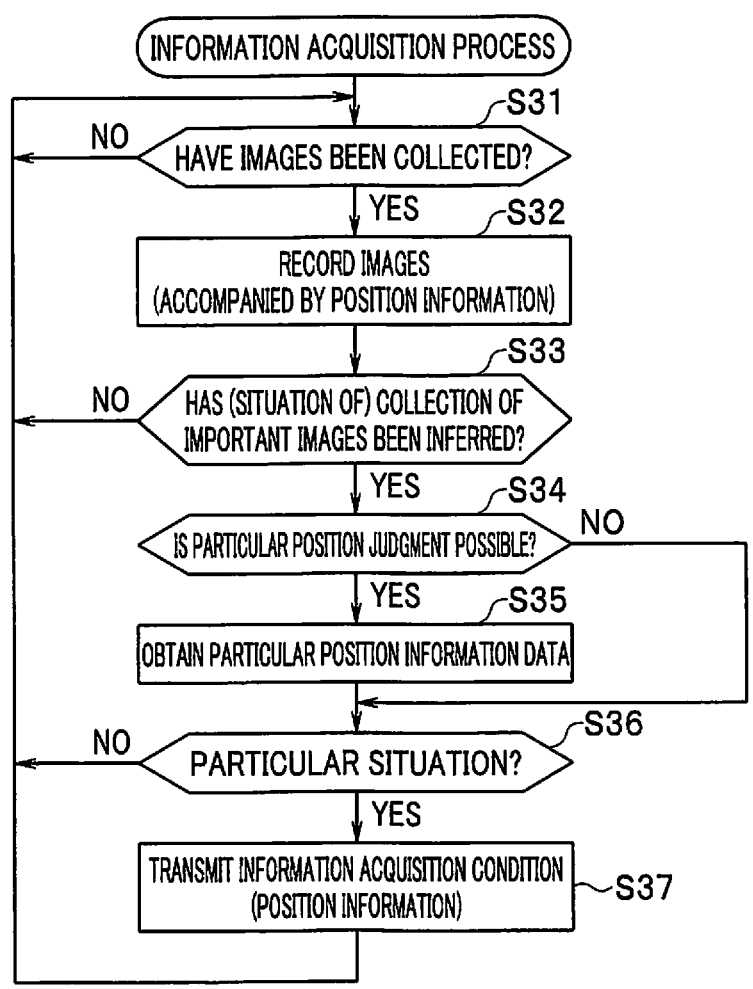
FIG. 6 is a flowchart showing an operation flow of a series of processes for information acquisition.

Next, an operation of the embodiment configured as described above will be described with reference to FIGS. 3 to 6. FIG. 3 is a flowchart showing an operation flow of the information acquisition control apparatus 10; FIG. 4 is a flowchart showing an operation flow of an external server; and FIG. 5 is an explanatory diagram for illustrating an outline of the inference process. FIG. 6 is a flowchart showing an operation flow of a series of processes for information acquisition.

At step S1 in FIG. 3, the controlling portion 11 of the information acquisition control apparatus 10 judges whether an observation mode has been specified or not. If the observation mode has been specified, the controlling portion 11 accepts a user operation of the operation inputting portion 14 and makes settings for controlling the cell observation apparatus 20a according to the operation at next step S2. For example, the controlling portion 11 sets a position of the camera device 43, that is, a photographing position, sets a photographing date and time and sets photographing parameters, based on the user operation. The controlling portion 11 detects the photographing position and the photographing date and time as a detected situation and detects the photographing parameters and a photographing action as a detected action.

Next, at step S3, the controlling portion 11 instructs the cell observation apparatus 20a to perform image pickup according to the settings. That is, the controlling portion 11 transmits control information for controlling movement to the movement controlling circuit 48 via the communicating portions 13 and 48a and outputs control information for controlling photographing to the camera device 43 via the communicating portions 13 and 49.

The movement controlling circuit 48 thereby causes the camera device 43 to move to a predetermined photographing position, and the camera device 43 picks up an image of the cells 53 at a predetermined timing with predetermined photographing parameters. The camera device 43 transmits an image obtained by performing image pickup to the controlling portion 11 of the information acquisition control apparatus 10 via the communicating portions 49 and 13. The controlling portion 11 gives the received observation image to the display portion 17 to cause the observation image to be displayed (step S4).

At step S5, the controlling portion 11 judges whether recording of the observation image is specified or not. If recording is specified, the controlling portion 11 gives the received observation image to the recording portion 12 to record the observation image (step S6). In this case, the detected situation and the detected action that have been detected (for example, an image pickup result and an image pickup condition) are also recorded to the recording portion 12. Note that if recording is not specified, the controlling portion 11 returns the process from step S5 to step S1.

By recording not only the image but also a history up to the recording together at step S6, the controlling portion 11 can cause a result and a process to be teacher data for learning. If a history of operations after photographing is recorded as necessary, a learning result can be adopted for initialization of the apparatus after step S6.

In the observation mode, steps S1 to S6 are repeated, and observation images, and detected situations and detected actions detected at the time of acquiring the observation images are sequentially recorded. The inference process is performed using the detected situations and detected actions sequentially recorded in this way.

In the example in FIG. 3, it is shown that an external server is caused to perform the inference process, and the information acquisition control apparatus 10 performs the acquisition control process. If the controlling portion 11 judges at step S1 that the observation mode is not specified, the controlling portion 11 causes the process to transition to step S11 and judges whether an inference engine cooperation mode is specified or not. Setting of a mode may be automatically performed by judging a case where a user is a beginner, a case where an experiment is often re-conducted, and the like from a profile or a history of results of experiments conducted so far. The judgment can be made, in a laboratory, based on room entry management, information about login to office equipment such as a personal computer or a system. If the inference engine cooperation mode is specified, the controlling portion 11 requests a cooperating external apparatus to perform the inference process (a learning process) (step S12). That is, the controlling portion 11 transmits information about detected situations and detected actions read from the recording portion 12 to an external apparatus 60 (FIG. 5) via the communicating portion 13. At step S13, the controlling portion 11 receives an inference model (an information acquisition condition) that the external apparatus 60 has obtained by making an inference based on the detected situations and the detected actions and records the inference model (the information acquisition condition) to the recording portion 12.

Thus, by performing control taking into account an operation history of the apparatus itself or a use history of the user of the apparatus, it becomes unnecessary to take into account such a target object that the apparatus cannot pick up an image of. Or, images and the like obtained by apparatuses with similar specifications that are used for similar purposes may be used as teacher data at the time of learning. For example, if a plurality of apparatuses are used in the same laboratory, it is possible to learn use methods implemented by other apparatuses or users and reflect or adopt standard operations. If such images are on the Internet, being accompanied by use history data, use methods adopted at places other than the laboratory are reflected, and it becomes possible to introduce a new apparatus use method and the like, which leads to new discovery.

FIGS. 4 and 5 show the inference process by the external apparatus 60. Note that the external apparatus 60 constitutes artificial intelligence to realize machine learning, depth learning and the like similarly to the inferring portion 11a and performs inference using the artificial intelligence. The inference process is a process similar to the inference process by the information acquisition control apparatus 10.

At step S21, the external apparatus 60 is in a state of waiting for a request for learning. When learning is requested, the external apparatus 60 reads detected situations and detected actions as teacher data at step S22 and executes machine learning, for example, depth learning (step S23). For example, using images as teacher data, the external apparatus 60 judges whether learning to find out a rule regarding what kind of photographing has been performed under what kind of situation has been performed or not, that is, whether an information acquisition condition regarding under which situation photographing is to be performed has been learned or not, from metadata and accompanying related data that are attached to the images (or information that may be read from the images) (step S24).

An inference engine schematically shown with input and output layers and neurons in an external apparatus in FIG. 5 sets such an inference model that the input layer inputs situation data, and an information acquisition condition for information to be acquired under the situation (target object identification information) is outputted as strength of combination among the respective neurons (weighting). The output from the output layer of the inference engine becomes an inference result. That is, an inference result according to the situation detecting portion 24 configured to acquire information related to a situation detected before an image pickup action by the user is led and the image pickup action, and the user's image pickup history is obtained by an inference model learned based on the information from the situation detecting portion 24. Though the above inference model is assumed to output target identification information (an information acquisition condition) with a situation at a particular date and time as an input, the date and time or a timing itself may be used as an input instead of the situation at the date and time.

If an information acquisition condition is derived, the external apparatus 60 transmits the inference model to the information acquisition control apparatus 10 at step S25 and returns the process to step S21. If particular reliability is not obtained in the information acquisition condition as a result of inference, a parent body for learning is reset, or weighting and design of the neurons are changed at step S26. Then, to obtain a particular reliability level, machine learning, for example, depth learning is performed again at step S23.

The above case corresponds to a case where only images that are not desired by a researcher are picked up. That is, if images at positions where the researcher do not want to observe or pick up an image are displayed, it is assumed that intended learning has not been performed, and learning is performed again. That is, though teacher data is obtained by pairing an example of an image that a user is thought to want to pick up and observe and information accompanying the image, an image that the user does not want to pick up (observe) and information accompanying the image are also caused to be learned as teacher data so that such image and accompanying information can be identified as necessary. An inference model for inferring a situation under which the user wants to pick up an image is obtained by learning based on such teacher data, and it is preferable that the image that the user is thought to want to pick up is an image that the user is likely to be able to photograph by the image pickup apparatus. The user can pick up an image that he/she does not want to pick up by the image pickup apparatus. By daring to select the image that he/she does not want to pick up, the intention can be clearly reflected.

An inference model obtained in this way is given to the information acquisition control apparatus 10 as an information acquisition condition. If the controlling portion 11 of the information acquisition control apparatus 10 judges that the inference engine cooperation mode is not specified at step S11, the controlling portion 11 judges whether a current situation corresponds to the information acquisition condition obtained by inference or not at step S14. If the current situation corresponds to the information acquisition condition, the controlling portion 11 generates control information corresponding to the information acquisition condition at step S15 and outputs the control information to the cell observation apparatus 20a at step S16.

Here, if the user is going to take an action himself/herself, the apparatus seems to arbitrarily behave without being asked. Therefore, some good way is figured out, for example, so that step S1 is not branched to NO, or step S14 is not branched to YES. For example, the condition for branching to YES at step S14 can be included in an AND condition together with permission by the user.

The movement controlling circuit 48 of the cell observation apparatus 20a causes the camera device 43 to move to a particular position based on the control information, and the camera device 43 photographs the cells 53 at a particular timing with particular photographing parameters based on the control information. The camera device 43 transmits an image obtained by the photographing to the information acquisition control apparatus 10. In this way, the controlling portion 11 of the information acquisition control apparatus 10 records an observation image, which is a photographing result, and an information acquisition condition used at the time of acquiring the observation image to the recording portion 12.

FIG. 6 illustrates an example of information acquisition by the series of processes described above. FIG. 6 shows the acquisition process, the inference process and the acquisition control process in the case of, for example, in observation of cells, inferring a position on the culture vessel 51 that an observer wants to observe first and automatically acquiring an observation image. As described above, the processes can be realized by one of the information acquisition control apparatus 10, the cell observation apparatus 20a and the external apparatus 60 or by being distributed to two or three.

Step S31 in FIG. 6 shows a waiting state in the observation mode corresponding to step S1. In the observation mode, collection of images according to the observer's action is performed. The images acquired by the camera device 43 are recorded to the recording portion 12 together with information about photographing positions (step S32). A situation of image collection thought to be important is inferred by the inference process using the recorded information about the photographing positions (step S33).

For example, it is possible to infer which position on the culture vessel 51 the observer observes (photographs) first at the time of starting daily observation, by detected situations and detected actions. If an observation image is included as information about a detected situation, it is also possible to infer a position of a particular image part, such as a lesion part, by image analysis of the observation image. If such a particular position is obtained as a result of inference, the process is caused to transition from step S33 to step S34, and an information acquisition condition, the particular position, is obtained as a result of inference (step S35). For example, a condition of starting observation can be obtained as an information acquisition condition as a result of inference.

At next step S36, it is judged whether the information acquisition condition is satisfied or not. For example, if the particular information of starting observation is satisfied, control information for performing photographing at an image pickup position with photographing parameters according to the information acquisition condition is transmitted to the movement controlling circuit 48 and the camera device 43.

In this way, an important part which the observer wants to observe at the time of starting observation, for example, a lesion part or the like, is preferentially photographed.

As described above, in the present embodiment, since an information acquisition condition is determined by inference using detected situations and detected actions based on the observer's actions, and control is performed to acquire information based on the information acquisition condition, it becomes possible to preferentially observe (pick up an image of) an observation point that the observer thinks important. In observation of cells, since an angle of view of the camera device is relatively small, it takes a relatively long time period to observe the whole culture vessel. Moreover, in observation of cells, it is also conceivable that the cells change relatively little. Therefore, by determining a part where an image changes relatively much, or a part which the observer observes first by inference, such a part thought to be important is observed preferentially, for example, more frequently than other parts, and, thereby, it is possible to improve efficiency of the observation of the cells.

As described above, a mobile image pickup system can be applied to a cell observation apparatus and the like. If the cell observation apparatus is provided with a movable image pickup portion, and target object identification information for identifying an image pickup target is given to a controlling portion configured to move the image pickup portion, for example, from an external mobile image pickup instruction apparatus, then the cell observation apparatus (a magnified observation apparatus) can detect cells or other minute objects specified in advance by using image analysis together as necessary, move the image pickup portion to a particular position and cause the image pickup portion to perform image pickup at an optimum timing. The mobile image pickup instruction apparatus (which may be built in instead of being a separate body) has a target object identification information generating portion, and the target object identification information generating portion generates the above target object identification information according to an inference result according to the user's image pickup history information and transmits the target object identification information to the mobile image pickup instruction apparatus. Observation of cells requires very detailed control, and difference occurs due to a little environmental change. Therefore, by judgment utilizing a large amount of data using artificial intelligence as in the present embodiment, very efficient observation can be realized.

Third Embodiment

Figure 7A:
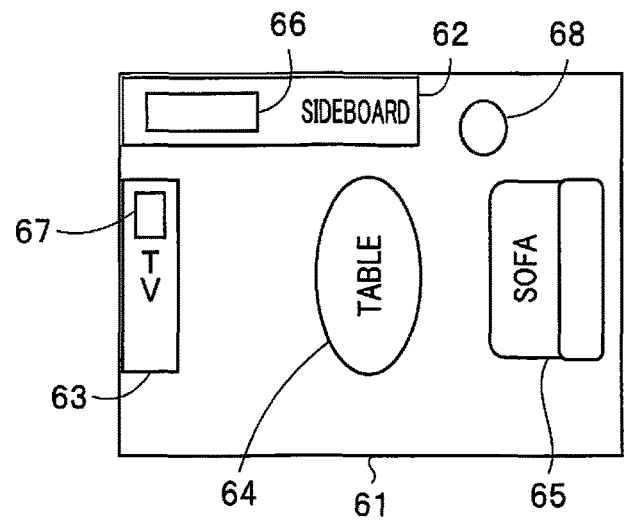
FIG. 7A is an explanatory diagram according to a third embodiment of the present invention.
Figure 7B:
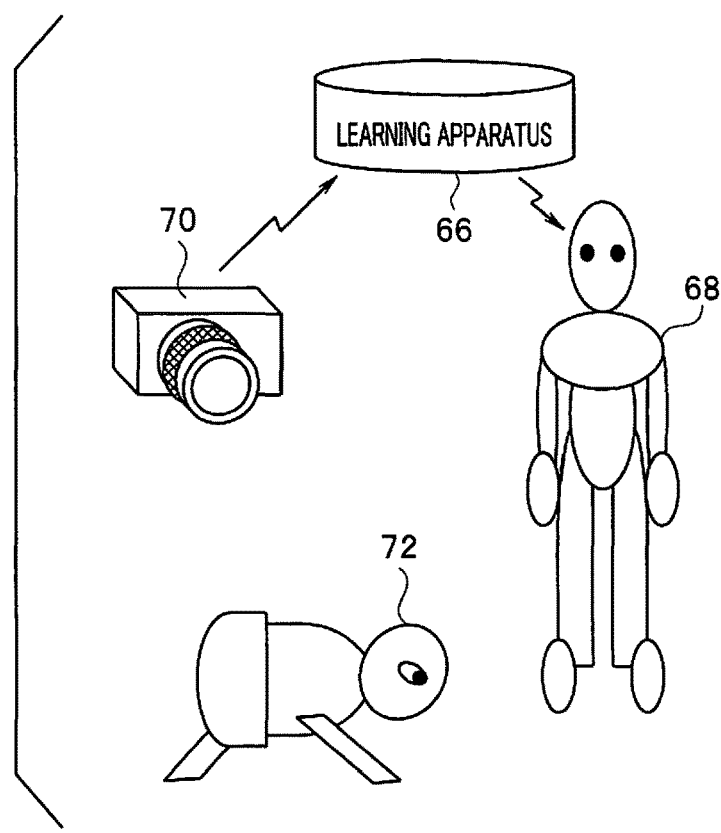
FIG. 7B is an explanatory diagram according to the third embodiment of the present invention.

FIGS. 7A and 7B relate to a third embodiment of the present invention and are explanatory diagrams showing an example in which the acquisition process by the information acquisition control apparatus 10 and the information acquisition apparatus 20 of FIG. 1 is realized by a camera 70, the inference process is realized by a learning apparatus 66, and the acquisition control process is realized by a robot 68 as a mobile image pickup apparatus. Note that it is assumed that the robot 68 is provided with necessary circuits in FIG. 1 to realize following functions.

FIG. 7A shows a state of a room interior 61. In the room interior 61, a sideboard 62 and a television (TV) 63 are arranged along a wall. A table 64 is arranged in a center of the room interior 61, and a sofa 65 is arranged in front of the table 64. Note that the learning apparatus 66 is placed on the sideboard 62. An image management apparatus 67 is placed on the TV 63. Moreover, the robot 68 exists in the room interior 61.

FIG. 7B shows that, by photographing a baby 72 by the camera 70, information about a detected situation and a detected action (for example, an image pickup result and an image pickup condition is transmitted to the learning apparatus 66, and, for example, an information acquisition condition for photographing the baby 72 is transmitted from the learning apparatus 66 to the robot 68. That is, the camera 70 has a photographing function and is configured to realize the acquisition process described above. The learning apparatus 66 is configured to realize the inference process described above. The robot 68 has a moving function and a photographing function and is configured to realize the acquisition control process described above.

For example, it is assumed that a user not shown frequently photographs the baby 72 with the camera 70. Detected situations including picked-up images and detected actions from the camera 70 are given to the learning apparatus 66. In this case, for example, the learning apparatus 66 can infer that the user wants to photograph an image of the baby 72 and can further infer that the user wants to record a process of growth of the baby 72, from the detected situations and the detected actions. For example, if the learning apparatus 66 judges that picked-up images of the baby 72 have been accumulated for a half a year or more and that, though images of the baby 72 sitting on buttocks exist, there is no image of the baby 72 standing, holding on something, the learning apparatus 66 can set a condition of photographing a state in which the baby 72 stands, holding on something, as an information acquisition condition.

Furthermore, in a case where the camera 70 is photographing a state of the room interior 61, the learning apparatus 66 can judge a place where the baby 72 can easily stand, holding on something or a place where there is a stuffed animal. For example, the learning apparatus 66 can recognize that the baby 72 often stands, holding on a step of the sofa 65, stairs and the like, by image information and the like that can be acquired from a cloud server not shown. Therefore, an information acquisition condition may be set so that, in the case of causing image pickup of the baby 72 standing, holding on something to be performed, the photographing is to be performed at the step part of the sofa 65, the stairs or the like.

An example of the baby 72 "standing, holding on something" has been shown as an example of an image that the user is thought to want to photograph. The image may be specified by the user as the user's request, may be inferred from pictures of the baby 72 that have been daily photographed, or may be presumed from information published on the Internet, such as information about how many months after birth a baby is likely to stand, holding on something or information recorded in the server described above, information of SNS (social network services) and the like. Standing, holding on something may be judged from popular similar baby images. Pieces of information to accompany the images of standing, holding on something are "age in months", "step parts" in the background or the like. Characteristics of voices of the babies may be set as general accompanying information about babies. By pairing the piece of such accompanying information and "the images of standing, holding on something", respectively, into teacher data, an inference model for inferring a situation that the user wants to photograph can be obtained by learning. Here, it is possible to judge whether "the images of standing, holding on something" are worth learning or not depending on whether the robot 68 can photograph the images. For example, in a case of a robot that cannot go out of a room where there is no step, it is better to select and learn popular images other than images of "standing, holding on something". For example, in a case of a picture of "crawling", importance of factors such as a background, composition and blurring increases, and, therefore, learning is performed so that photographing taking into account the factors can be performed. It is possible to wait for the baby 72 at a place similar to backgrounds of popular images and it is possible to catch a crucial moment for a good shot of composition or a pose. For example, there is a method of obtaining a lot of images by consecutive shots to select an image from among the images and give the image to the user. The robot 68 can be adapted to, for a picture of the laughing baby 72, judge a laughing voice and start a photographing operation. There may be a case where the user cannot obtain a desired image due to restrictions of an angle, a positional relationship between the camera and the baby 72, and the like in addition to environmental restrictions as described above. However, learning for image acquisition in such a case is useless for a robot that cannot perform image acquisition in such a case. Therefore, for an image that the user is thought to want to photograph, it is better to further select images that the robot 68 is likely to be able to photograph, based on information about functions and performance of the robot 68 and reflect the images at the time of inference.

The learning apparatus 66 transmits information about an information acquisition condition to the robot 68 existing in the room interior 61. Consequently, when the robot 68 detects the baby 72 based on the information acquisition condition, the robot 68 can photograph, for example, a scene of the baby 72 standing, holding on something.

Figure 8:
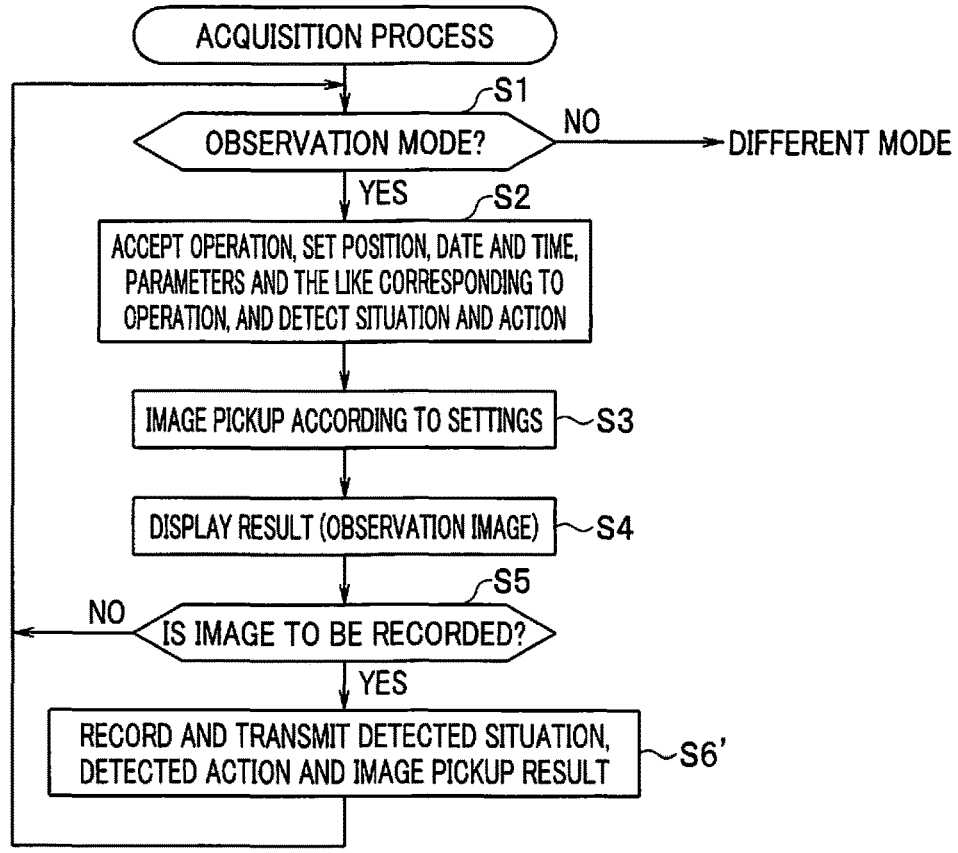
FIG. 8 is a flowchart showing an operation flow of a camera 70.
Figure 9:
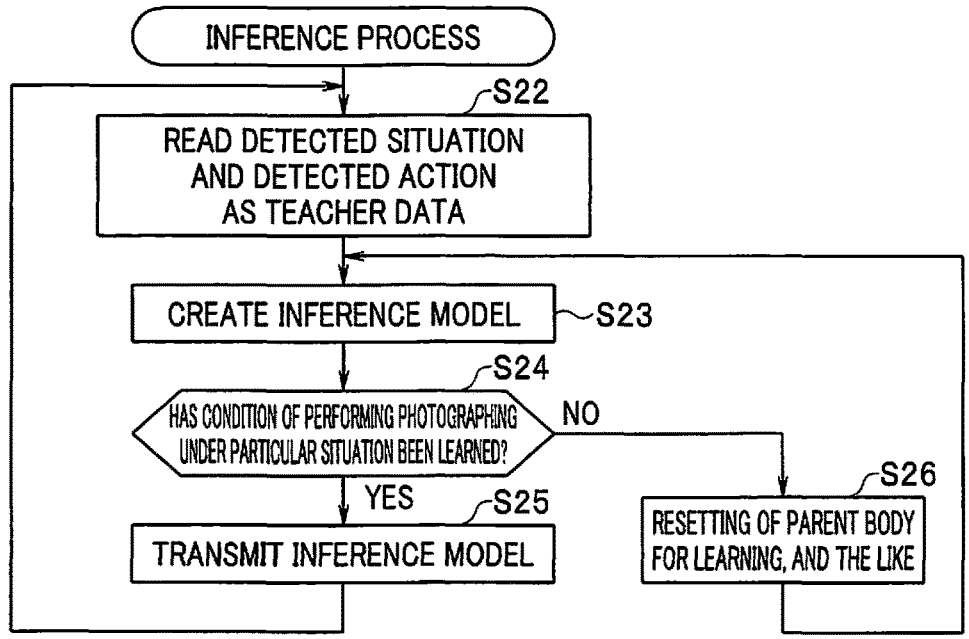
FIG. 9 is a flowchart showing an operation flow of a learning apparatus 66.
Figure 10:
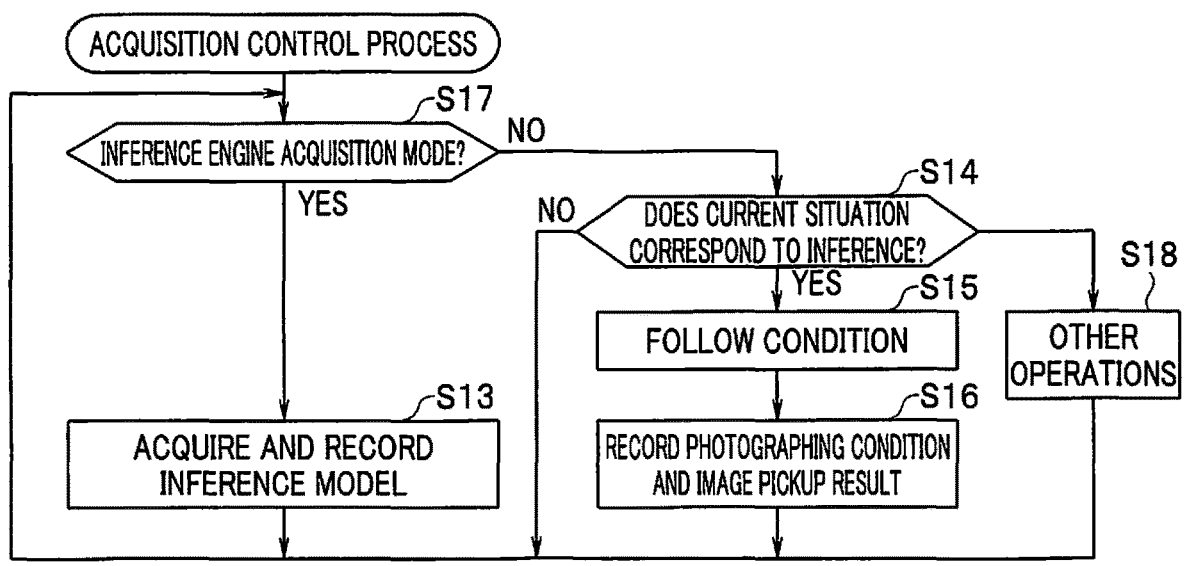
FIG. 10 is a flowchart showing an operation flow of a robot 68.
Figure 11:
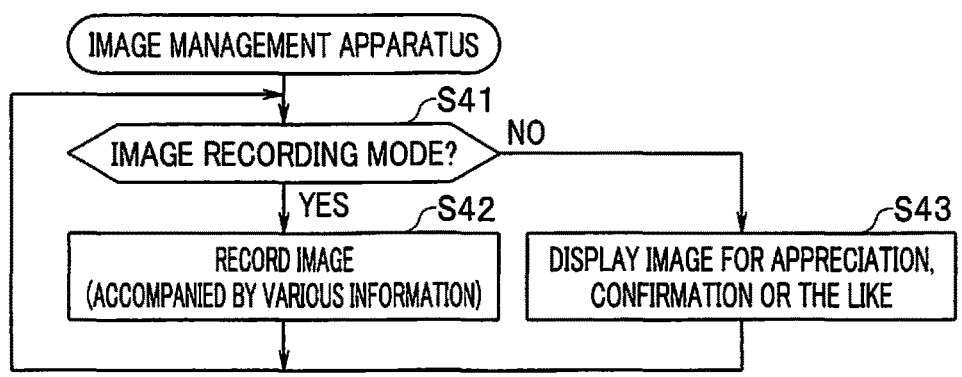
FIG. 11 is a flowchart showing an operation flow of an image management apparatus 67.

Next, an operation of the embodiment configured as described above will be described with reference to FIGS. 8 to 11. FIG. 8 is a flowchart showing an operation flow of the camera 70; FIG. 9 is a flowchart showing an operation flow of the learning apparatus 66; and FIG. 10 is a flowchart showing an operation flow of the robot 68. FIG. 11 is a flowchart showing an operation flow of the image management apparatus 67. In each of procedures in FIGS. 8 to 10, same steps as steps in FIG. 3 or 4 will be given the same reference numerals, and description of the steps are omitted, and a corresponding step will be given a reference numeral with an apostrophe and briefly explained.

Processes of steps S1 to S5 in the acquisition process in FIG. 8 are similar to FIG. 3. The acquisition process in FIG. 8 is realized by the camera 70. At step S6', the camera 70 records a detected situation, a detected action and a picked up image that have been acquired and transmits the detected situation, the detected action and the picked-up image to the learning apparatus 66.

The inference process of steps S22 to S26 in FIG. 9 is similar to FIG. 4. That is, the learning apparatus 66 reads detected situations and detected actions as teacher data at step S22 and executes inference (step S23). Here, for example, images that the user is thought to like among images published on SNS or the like on the Internet may be used as teacher data as they are. The images include various information such as backgrounds, and "photographing time situation data which is data included in an image pickup condition and "image pickup results" can be obtained from the images (image files). The photographing time situation data and the image pickup results can be said to be, so to speak, photographing history data or photographing tendency information. The "history" shows what the large number of images are and in which tendency the images are recorded. The history can be said to be a history of data accumulated by a lot of users so far. It is possible to, by using the information, perform learning for obtaining information that a current situation is such a particular situation suitable for photographing that it is better to perform photographing by the robot 68 in the situation, as an output. Therefore, it is preferable that the images are ones that the robot 68 can photograph. Such images can be narrowed down based on functions and performance of the robot 68. Or, images may be selected by comparison with images photographed by the robot 68 so far.

When the teacher data such as images that the user is thought to like is assumed to be first teacher data, it is conceivable to adopt images that the robot 68 cannot photograph as second teacher data. The adoption of the second teacher data is intended to learn that the second teacher data is not outputted as candidates for a photographing time situation in an image pickup condition. Images that the user does not like, images that cannot be photographed in certain environments and the like are also regarded as second teacher data as far as the images can be recognized to be so.

The teacher data includes the image pickup history information (the photographing tendency information) about the user in the images or as auxiliary data. Therefore, it is possible to judge a particular situation in which an image that the user is likely to like is photographed by the photographing tendency information. By analyzing the large number of images, it is possible to analyze how much the baby 72 has grown up and what the baby 72 can do from the face of the baby 72. By referring to results of the robot 68 or the user having photographed before and using learning results as above, it becomes possible to make an inference such as that, since the baby 72 was "crawling" before, the baby 72 is likely to be able to stand, holding on something soon statistically.

Thus, an end of learning is determined by whether or not an image that the user wants and the robot 68 can photograph can be identified from other images. That is, the learning apparatus 66 judges whether an information acquisition condition that photographing is performed under a particular situation has been learned or not (step S24). Here, the judgment can be made based on whether pictures that are not desired or images that the robot 68 is unlikely to be able to photograph have been correctly excluded or not. The judgment may be made by using teacher data or by a verification method in which it is verified what image is specified to be photographed when a particular situation is inputted. If an information acquisition condition is derived, the learning apparatus 66 transmits an inference model to the information acquisition control apparatus 10 at step S25 and returns the process to step S21. If an information acquisition condition is not obtained, the learning apparatus 66 resets the parent body for learning at step S26 and, after that, performs inference again at step S23. Babies' crying voices, cries of pets or the like as auxiliary data may be caused to be learned as teacher data so that a situation is photographed or be merely applied to a purpose of performing image pickup to perform streaming delivery to a person who is worried. In this case also, second teacher data for making a judgment that "such a voice does not have to be transmitted" may be prepared and caused to be learned.

FIG. 10 shows the acquisition control process by the robot 68. If the robot 68 judges at step S17 that an inference engine acquisition mode is specified, the robot 68 causes the process to transition to step S13, receives information about an information acquisition condition, which is an inference model, from the learning apparatus 66 and records the information to a built-in recording medium not shown. The robot 68 performs image pickup based on the recorded information acquisition condition.

For example, photographing of the baby 72 standing, holding on something is specified by the information acquisition condition, the robot 68 is located near the sofa 65 in the room interior 61 and is a state of waiting for photographing the baby 72 standing, holding on something. When the baby 72 stands, holding on the sofa 65 (step S14), the robot 68 photographs and records the baby 72 standing, holding on the sofa 65 according to the information acquisition condition at step S15 (step S16). Note that it is not necessary for the robot 68 to be still and wait until the baby 72 stands, holding on something, but the robot 68 may perform other operations at step S18.

Note that a picked-up image obtained by the camera 70 and the robot 68 performing photographing can be transferred to the image management apparatus 67 to be recorded. At step S41 in FIG. 11, the image management apparatus 67 judges whether an image recording mode is specified or not. If the current mode is the image recording mode, the image management apparatus 67 records the picked-up image obtained by the camera 70 and the robot 68 performing photographing (step S42). Note that, in this case, information about a detected situation, a detected action and the information acquisition condition may be recorded together. If the current mode is not the image recording mode, the image management apparatus 67 displays an image that is recorded for appreciation, confirmation or the like (step S43).

Thus, in the present embodiment also, effects similar to the effects of the first and second embodiments can be obtained.

Fourth Embodiment

Figure 12:
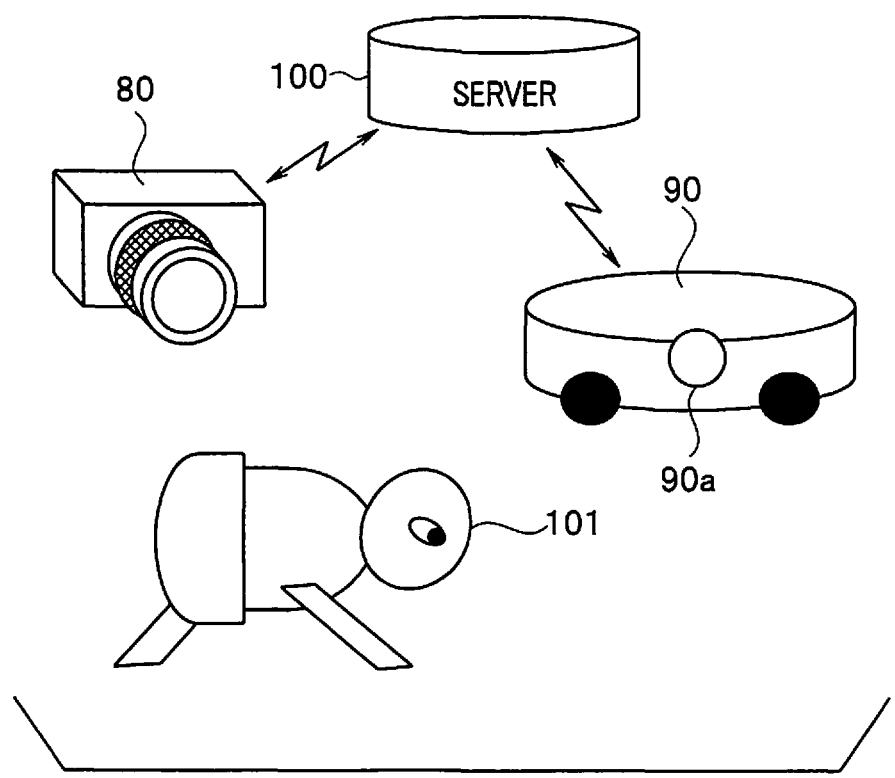
FIG. 12 is an explanatory diagram according to a fourth embodiment of the present invention.

FIG. 12 relates to a fourth embodiment of the present invention and is an explanatory diagram showing an example in which the acquisition process by the information acquisition control apparatus 10 and the information acquisition apparatus 20 of FIG. 1 is realized by a camera 80, the inference process is realized by a learning server 100, and the acquisition control process is realized by a robot vacuum cleaner 90 as a mobile image pickup apparatus. Note that it is assumed that the robot vacuum cleaner 90 is provided with necessary circuits in FIG. 1 to realize following functions.

The camera 80 is operated by a user not shown to pick up an image of an object, record a picked-up image and transmit the picked-up image to the learning server 100. The camera 80 transmits information about a detected situation and a detected action (for example, an image pickup result and an information acquisition condition) to the learning server 100. Note that the camera 80 may transmit only the picked-up image to the learning server 100, and the information about the detected situation and the detected action may be determined from the picked-up image in the learning server 100.

The robot vacuum cleaner 90 can freely move and is provided with a function of performing photographing by an image pickup portion 90a. Movement and photographing of the robot vacuum cleaner 90 are controlled by the learning server 100.

Figure 13:
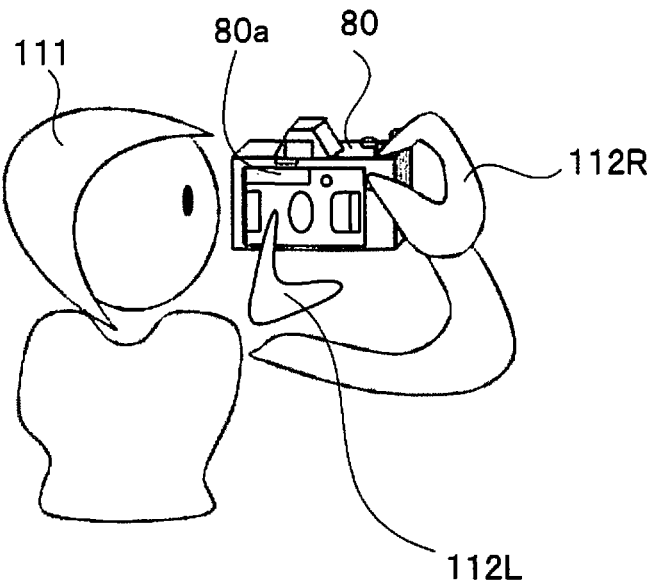
FIG. 13 is an explanatory diagram showing that a user specifies an information acquisition condition by a camera 80.
Figure 14:
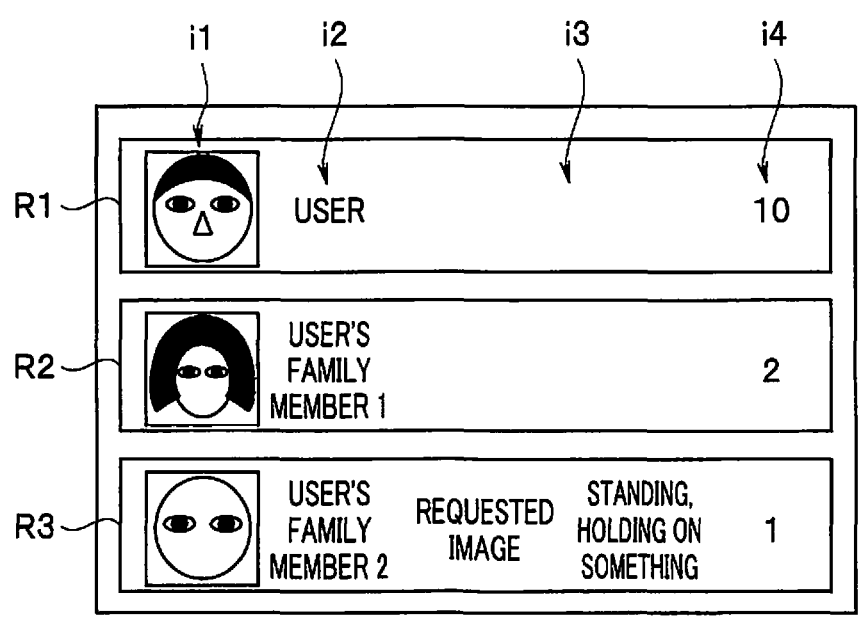
FIG. 14 is an explanatory diagram for illustrating information obtained as a result of inference by a learning server 100.
Figure 15:
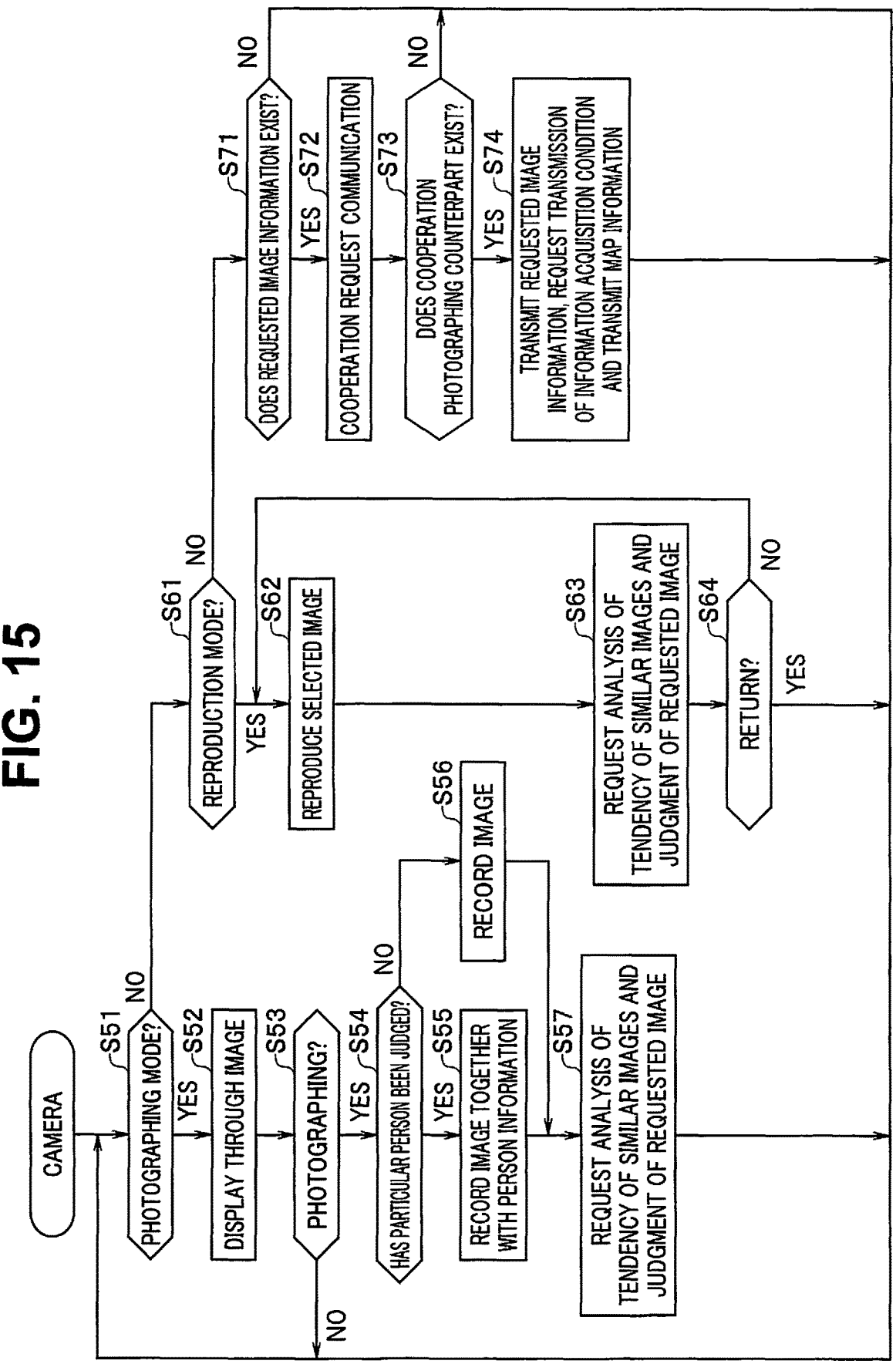
FIG. 15 is a flowchart for illustrating an operation of a camera 80.
Figure 16:
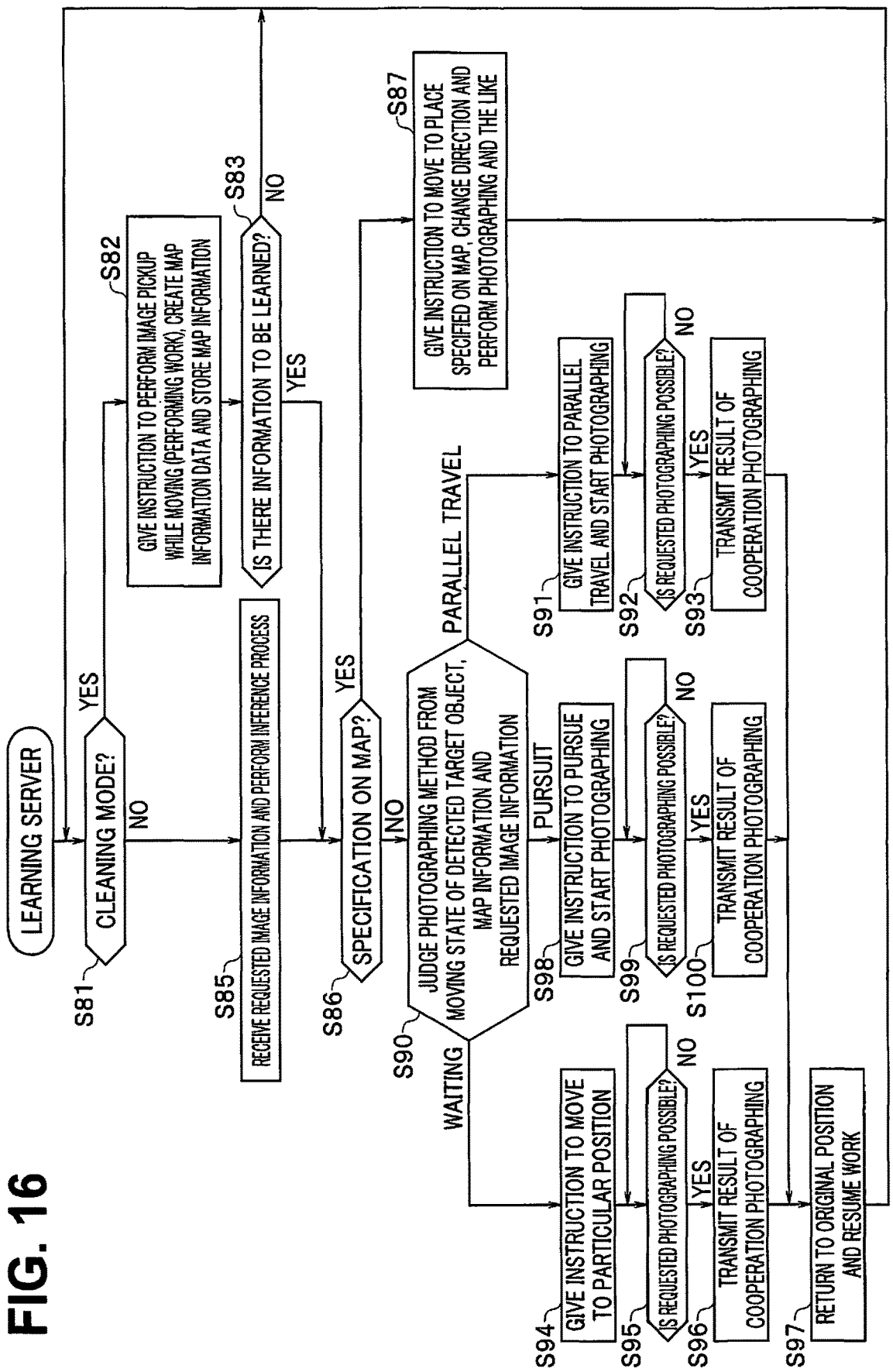
FIG. 16 is a flowchart for illustrating an operation of the learning server 100.
Figure 17:
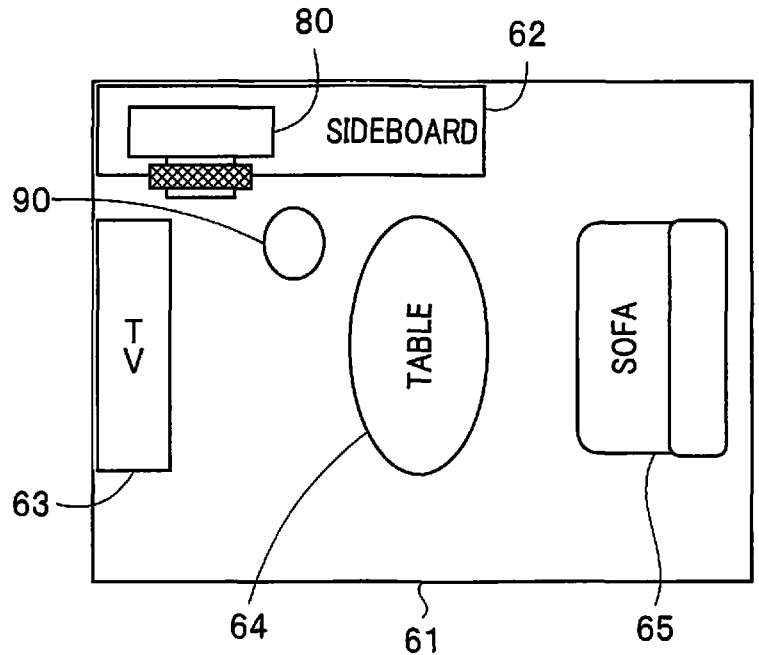
FIG. 17 is an explanatory diagram for illustrating that the camera 80, a robot vacuum cleaner 90 and the learning server 100 perform image pickup in cooperation.
Figure 18:
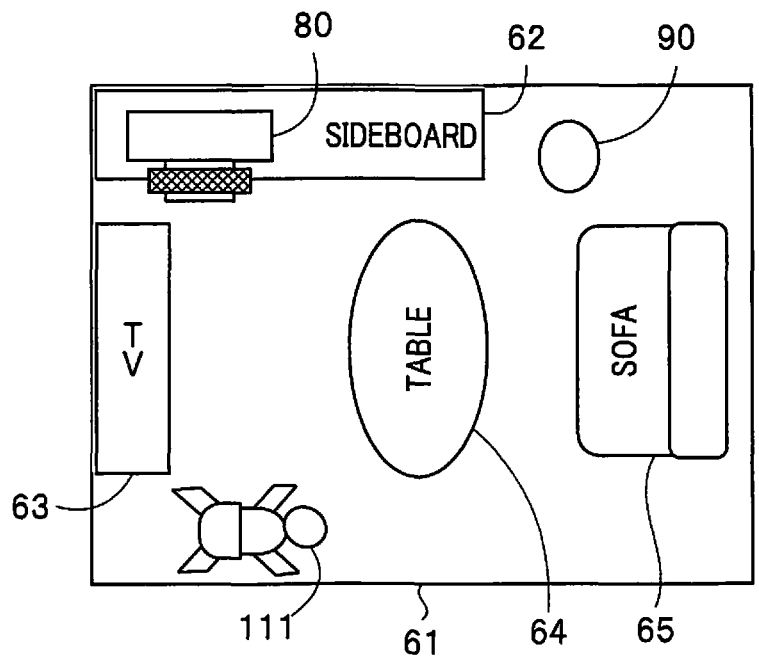
FIG. 18 is an explanatory diagram for illustrating that the camera 80, the robot vacuum cleaner 90 and the learning server 100 perform image pickup in cooperation.

Next, an operation of the embodiment configured as described above will be described with reference to FIGS. 13 to 18. FIG. 13 is an explanatory diagram showing that a user specifies an information acquisition condition by the camera 80. FIG. 14 is an explanatory diagram for illustrating information obtained as a result of inference by the learning server 100. FIG. 15 is a flowchart for illustrating an operation of the camera 80; and FIG. 16 is a flowchart for illustrating an operation of the learning server 100. FIGS. 17 and 18 are explanatory diagrams for illustrating that the camera 80, the robot vacuum cleaner 90 and the learning server 100 perform image pickup in cooperation.

FIG. 13 shows a state in which a user 111 grasps a case of the camera 80 with a right hand 112R, and is operating a touch panel provided on a display portion 80a provided on an almost all area on a back surface with a left hand 112L, confirming a through image displayed on the display portion 80a.

A description will be made on an example in which an object that the user 111 wants to photograph is a baby 101. FIG. 14 shows an example in which there are three records R1 to R3. Each of the records R1 to R3 includes pieces of information, items i1 to i4. The item i1 is image information which is a result of face recognition, the item i2 is information about a name corresponding to the result of face recognition, the item i3 is information about a condition at the time of image pickup, and the item i4 is information about a priority degree. The respective records R1 to R3 in FIG. 14 show information about a father, a mother and a baby, respectively. In the example in FIG. 14, a target object set to a highest priority degree 1 is the baby indicated by a user's family member 2, and "standing, holding on something" specified as a requested image is set as one of information acquisition conditions.

The learning server 100 determines the information acquisition condition shown in FIG. 14 by learning detected situations and detected actions. Note that the information acquisition condition includes information for identifying an image that the user 111 wants to pick up, and information about the detected situations and the detected actions includes requested image information for specifying a requested image. Furthermore, the learning server 100 controls movement and photographing of the robot vacuum cleaner 90 based on the information acquisition condition.

Note that when an object is the baby 101, not only standing, holding on something but also scenes of the baby 101 standing for the first time, the baby 101 walking for the first time, the baby 101 playing with a stuffed animal or the like can be set as an information acquisition condition. For example, in the case of performing photographing by the robot vacuum cleaner 90, it is possible for the robot vacuum cleaner 90 to perform image pickup for a relatively long time period, moving in the room interior 61 where there is no adult, due to characteristics of the robot vacuum cleaner 90, and there is a strong possibility that the robot vacuum cleaner 90 picks up images of the above scenes without missing a good opportunity for taking a good picture. The robot vacuum cleaner 90 can perform image pickup from a position close to a floor, and photographing of a tasteful picture different from ordinary photographing by an adult may be performed.

A place where the baby 101 can easily stand, holding on something or a place where there is a stuffed animal, and the like may be recorded in the robot vacuum cleaner 90 in advance, or may be grasped by daily image judgment during moving for cleaning. If a popular image on the Internet includes a sofa or the like, it may be judged from images or distance distribution whether there is anything similar to the sofa or the like.

At step S51 in FIG. 15, the camera 80 judges whether a photographing mode is specified or not. If the photograph mode is specified, the camera 80 displays a through image at step S52. That is, the camera 80 picks up an image of objects, gives a picked-up image to the display portion 80a as a through image to cause the through image to be displayed. Next, the camera 80 judges whether a photographing operation by the user 111 is performed or not (step S53). If a photographing operation is not performed, the process is returned to step S51.

If a photographing operation by the user 111 is performed, the camera 80 proceeds to step S54 and judges each of the objects or the like in the picked-up image. For example, the camera 80 judges a particular person, a pet or the like in the picked-up image. If a recognizable judgment result is obtained from the picked-up image, the camera 80 causes the picked-up image to be recorded to a memory or the like not shown together with information about the judgment result, for example, person information (step S55). Note that if a recognizable judgment result is not obtained, the camera 80 records only the picked-up image (step S56). Note that, at the time of recognizing the objects, the camera 80 may use a database set in advance, for example, a built-in database, a database or the like obtained from a cloud computer.

At next step S57, the camera 80 requests the learning server 100 to generate an information acquisition condition. For example, the learning server 100 performs image analysis of the picked-up image, performs tendency analysis of similar images, and judges an object that the user 111 have preferentially picked up an image of as a requested image. Then, the learning server 100 generates an information acquisition condition for identifying the object (a target object) which is a target of the requested image.

For example, if a condition of picking up an image of a particular target object is set by the user 111 operating the camera 80, the learning server 100 also recognizes the condition as an information acquisition condition. In this way, for example, the information acquisition condition shown in FIG. 14 is obtained. Note that though the respective records R1 to R3 in FIG. 14 are obtained by photographing operations by the user 111, all or a part of the respective pieces of information of the items i1 to i4 can be obtained by image analysis by the learning server 100. Note that all of the respective pieces of information of the items i1 to i4 may be acquired, for example, based on use operations of the camera 80.

If the camera 80 judges at step S51 that the photographing mode is not specified, the camera 80 proceeds to step S61 and judges whether a reproduction mode is specified or not. If the reproduction mode is specified, the camera 80 selects and reproduces an image based on a selection operation by the user 111 among images recorded in the memory or the like not shown, and causes the image to be displayed on a display screen of the display portion 80a at step S62. In the reproduction mode, the camera 80 can also request creation of an information acquisition condition (step S63). For example, in response to the request of the camera 80, the learning server 100 performs image analysis of the image being reproduced, performs tendency analysis of similar images, and judges an object that the user 111 has preferentially reproduced as a requested image. The learning server 100 generates and stores an information acquisition condition for picking up an image of the object which is a target of the requested image (a target object).

If the camera 80 judges at step S61 that the reproduction mode is not specified, the camera 80 proceeds to step S71 and judges whether requested image information based on an operation by the user 111 exists or not. If the requested image information does not exist, the process is returned to step S51. If the requested image information exists, the camera 80 attempts a request for communication for cooperation, to the learning server 100 at step S72. For example, the camera 80 attempts communication for a request for cooperation to perform image pickup in cooperation with the robot vacuum cleaner 90 that is capable of performing image pickup according to the information acquisition condition (hereinafter referred to as cooperation photographing). Note that the camera 80 may attempt the cooperation request communication each time the camera 80 transmits a picked-up image or may attempt the cooperation request communication at predetermined time intervals. The camera 80 may perform the cooperation request communication in response to access from the learning server 100 which is a communication counterpart. The camera 80 may be adapted to perform the cooperation request communication based on an operation by the user 111.

At step S73, the camera 80 judges whether communication between the learning server 100 and the robot vacuum cleaner 90 has been established or not. If cooperation request communication is established, the camera 80 proceeds to step S74, transmits requested image information to the learning server 100 to request the inference process, and causes the learning server 100 to transmit information acquisition condition. Note that if the camera 80 cannot cause cooperation request communication to be established with the cooperation photographing counterpart at step S73, the camera 80 returns the process to step S51.

The camera 80 can also cause the display portion 80a of the camera 80 to display a map of the room interior 61 based on an operation by the user 111 and identify a photographing position based on a touch panel operation. If such an operation is performed, the camera 80 transmits map information identifying the photographing position to the learning server 100 (step S74). The learning server 100 can set an information acquisition condition based on the received map information.

When the robot vacuum cleaner 90 receives information about the information acquisition condition, the robot vacuum cleaner 90 executes a predetermined action by detecting a target object identified by the information acquisition condition. For example, the robot vacuum cleaner 90 is picking up an image of a predetermined range by the image pickup portion 90a and, when the target object exists in the image pickup range, performs image pickup according to a condition shown by the information acquisition condition. Furthermore, in the present embodiment, the learning server 100 can instruct the robot vacuum cleaner 90 to wait for a target object to perform image pickup even when the robot vacuum cleaner 90 is not picking up an image of the target object.

The learning server 100 can judge whether such a waiting mode is specified or not. If the waiting mode is not specified, the learning server 100 records, when a picked-up image of a target object is given from the robot vacuum cleaner 90 as a cooperation photographing result, the picked-up image to a recording medium not shown. On the other hand, if the waiting mode is specified, the learning server 100 gives an instruction to the camera 80 to detect a target object specified by the information acquisition condition. In this case, the learning server 100 detects the target object by an image of the target being picked up by the camera 80. When the learning server 100 detects the target object by image pickup by the camera 80, the learning server 100 transmits a waiting instruction to the robot vacuum cleaner 90. When the robot vacuum cleaner 90 receives the waiting instruction, the robot vacuum cleaner 90 moves to a waiting position set for the target object and enters a state of waiting for photographing of the target object regardless of whether the target object exists in the image pickup range of the image pickup portion 90a of the robot vacuum cleaner 90. Note that the robot vacuum cleaner 90 may be adapted to, if a plurality of target objects are included as image pickup targets according to an information acquisition condition, move to a waiting position for a target object to which a highest priority degree is given.

Note that though it has been described that, in the waiting mode, the learning server 100 gives a waiting instruction to the robot vacuum cleaner 90 in response to the camera 80 picking up an image of a target object, content of the waiting instruction may be included in an information acquisition condition in advance. In this case, when the robot vacuum cleaner 90 receives the information acquisition condition including the waiting instruction, the robot vacuum cleaner 90 may move to a waiting position set for a target object and enter a state of waiting for photographing of the target object regardless of whether the target object exists in an image pickup range of the camera 80.

In this case, it is preferable that a photographing spot is recorded in the map information that the robot vacuum cleaner 90 has so that it is possible to judge how the robot vacuum cleaner 90 can move to the photographing spot without an obstacle. It is important that it is possible to judge whether the robot vacuum cleaner 90 is likely to be able to photograph an image or not, by recording the map that the robot vacuum cleaner 90 has or images photographed before. Useless and forced photographing of an image that the robot vacuum cleaner 90 cannot photograph is thereby avoided. Thus, by using teacher data at the time of learning in the present embodiment, an image that the robot vacuum cleaner 90 is likely to be able to photograph is selected. Therefore, it is preferable that the robot vacuum cleaner 90 has information about a movement distance of a movement route and a speed at which the robot vacuum cleaner 90 can move so that control taking into account a time period required to arrive at the position can be performed. Since it is necessary to, in order to wait for a moving target object, move faster and arrive at the place than the moving target object, there may be a case in which waiting photographing should be given up considering energy saving. In consideration of the above situation, such waiting photographing may be more rational in some cases that it is judged immediately that a baby or a pet comes into the room interior 61 by sensing a sound such as a voice or footsteps with a sensor such as a microphone.

As described above, it is possible to cause the excellent effect of the present invention to be shown by using information other than an image, for example, sound. For example, an application of a robot that, in response to a voice or footsteps of a baby or a pet, photographing the baby or pet is possible. That is, in the case of preparing the inference engines schematically shown with the input and output layers and the neurons as shown in FIG. 5, as a learned model, situation data of the input layer can be sound in the above case. More information other than sound may be inputted. Here, for simplification, such an inference model is set that sound is inputted to indicate strength (weighting) of combination among the neurons, and an image of a baby or a pet is outputted as information to be acquired in the situation. The output from the output layer of the inference engine becomes an inference result. For example, if a lot of baby images are published on SNS or the like on the Internet and highly appreciated, an external apparatus may search for voices of babies as characteristics of babies and sets the voices and the baby images as teacher data. When a voice of the baby 101 is acquired and detected by a microphone, the voice can be set as "a situation detected before an image pickup action by the user 111 is lead" or "information related to the image pickup action". A detected situation to be acquired and an inference result according to the image pickup history of the user 111 are obtained by an inference model learned based on information from the situation detecting portion 24. Though the above inference model is assumed to output target identification information (an information acquisition condition) with a situation at a particular date and time as an input, the date and time or a timing itself may be used as an input instead of the situation at the date and time. The output may be a representative image. It becomes possible to perform such control that, if the image is obtained, the robot vacuum cleaner 90 moves to a place with a background similar to searched backgrounds, using the map and room interior images the robot vacuum cleaner 90 has, waits for a target object judged to be similar by an image judging function and performs photographing. That is, a mobile body such as the robot vacuum cleaner 90 has an image pickup portion, and, when target object identification information for identifying an image pickup target is given to a controlling portion of the robot vacuum cleaner 90 from the mobile image pickup instruction apparatus, the robot vacuum cleaner 90 moves (may not move) to a particular position (which may be specified or may be presumed by the robot vacuum cleaner 90 with map information or the like to be described later), and detect and photograph a target object specified in advance by image analysis. Here, the target object identification information is generated by a target object identification information generating portion of the mobile image pickup instruction apparatus according to an inference result based on image pickup history information about the user 111 and is transmitted to the robot vacuum cleaner 90.

At S81 in FIG. 16, the learning server 100 judges whether the robot vacuum cleaner 90 is in a cleaning mode or not. If the robot vacuum cleaner 90 is in the cleaning mode, the learning server 100 instructs the robot vacuum cleaner 90 to perform cleaning work. In this case, the learning server 100 instructs the robot vacuum cleaner 90 to clean the floor in the room interior 61 while moving, and perform image pickup (step S82). The learning server 100 creates a map of the room interior 61 and the like based on information from the robot vacuum cleaner 90 and stores map information.

FIG. 17 shows a state of the room interior 61. In the room interior 61, the sideboard 62 and the television (TV) 63 are arranged along the wall. The table 64 is arranged in the center of the room interior 61, and the sofa 65 is arranged in front of the table 64. Note that the camera 80 is placed on the sideboard 62, and the camera 80 is capable of picking up an image of an image pickup range which is a part of the room interior 61. Moreover, the robot vacuum cleaner 90 exists on a floor surface in the room interior 61.

As described above, in order to pick up an image of a baby standing, holding on something, an image pickup position from which an image of a position having a step can be picked up is suitable. The learning server 100 has judged whether or not there is information about such an image pickup spot to be learned, based on information from the robot vacuum cleaner 90 at the time of creating the map information (step S83), and, as for the information about the photographing spot, the learning server 100 registers position information about the spot with the map.

If the learning server 100 judges at step S81 that the cleaning mode is not specified, the learning server 100 performs the inference process at step S85. That is, the learning server 100 infers a target object which the user 111 desires to photograph and an image pickup condition based on requested image information.

The learning server 100 judges whether the information about specification on the map for identifying the photographing spot that the camera 80 has transmitted at step 74 has been received or not (step S86). If the information about specification on the map for identifying the photographing spot has been received, the learning server 100 proceeds to step S87 and gives the robot vacuum cleaner 90 instructions to move to a place specified on the map, change a direction and perform photographing and the like.

If the learning server 100 judges at step S86 that the information about specification on the map has not been received, the learning server 100 causes the process to transition to next step S90. At step S90, a photographing method based on an information acquisition condition obtained by inference is specified. The learning server 100 specifies the photographing method according to a moving state of a target object, a state of the map, an aspect condition and a waiting instruction.

Which situation is preferable, for example, to photograph the baby 101 is inferred as described above. However, photographing history information or photographing tendency information about the user 111 learned by an inference model that performs the inference is not necessarily required to be a history of the user 111 of the robot vacuum cleaner 90 himself/herself. For example, if a picture of a lovely baby is shown on SNS or the like on the Internet together with the baby's age in months, learning not to miss such an image can be performed. As for an age in months, it is possible to judge an approximate age by analyzing an image by artificial intelligence. If there are a lot of images of babies, information about laughing voices, crying voices, sounds of "crawling" and the like can be obtained by searching for sounds related to babies on the Internet or the like. That is, since as much information about babies as desired can be collected, it is easy to learn a tendency of pictures of babies that are often published on the Internet, a tendency of picture of babies which are highly appreciated, and the like by artificial intelligence. By causing accompanying information about the baby 101 at the time of photographing an image of the baby 101 (an image pickup result) to be teacher data for machine learning together, it is possible to judge "how-many-month-old the baby 101 is", "when the baby 101 takes a particular posture", "when the baby 101 cries", "when the baby 101 laughs", "when the baby 101 crawls" and the like can be judged as "photographing time situation data".

An example of judging an image or a change in the image is shown as the "photographing time situation" here. However, such situation judgment is also possible that, in addition to detection of looks and ordinary behaviors by a home camera, detection of behaviors by judgment of a human body posture by a business camera such as "when a suspicious behavior is detected" and "when unnatural work is performed" are also included. Furthermore, time and a place of the detection, movement of the camera itself, movement such as framing, an angle of view by zooming, change in composition and the like before the detection is led can be useful information to judge a user's needs. In addition to an image, sound and outputs of other sensors such as a position detection sensor, a posture sensor and an orientation sensor may be referred to.

The situation detecting portion to detect the above is only required to have a function of searching for information on the Internet. In the case of the example of the robot vacuum cleaner 90 here, however, such pictures that the robot vacuum cleaner 90 cannot photograph, for example, a picture of a baby playing on a beach and a picture of a baby in public transport such as an airplane and a ship are not suitable, and it is better not to include the pictures in the photographing time situation data. Of course, at the time of machine learning, if only images and photographing time situations corresponding to a scene are set as teacher data, the scene cannot be discriminated from other scenes, and, therefore, data other than the data of the scene is appropriately included so that a highly reliable judgment can be made. For example, if there are only babies' crying voices, there is a possibility that a baby's crying voice cannot be discriminated from similar crying voices of animals. Therefore, in order to distinguish babies' crying voices from crying voices of animals, it is better to include teacher data showing that a scene is not a corresponding scene. The above is not necessarily required under an environment where such a confusing case does not exist. As described above, in the image pickup system, information showing a relationship between an image pickup result (a situation leading to a user's action) and photographing time situation data (accompanying information or the action) is obtained. When the above is generally conceptualized and described, it is possible to, by the function of the inferring portion 11a of obtaining information about an information acquisition condition by the inference process based on a detected situation (here, an age in months or a voice of a baby as accompanying information, photographing point information from a background or the like, which may be read from an image) and information about a detected photographing action (a picture of the baby) have the robot vacuum cleaner 90 perform photographing of a picture instead of the user so as to avoid the user failing to perform photograph. As a controlling portion configured to control acquisition of information according to such an information acquisition condition, a server, a smartphone or a PC is assumed as the information acquisition control apparatus 10. Similar effects can be obtained when images obtained on the Internet or the like are used as teacher data, or from images the user personally photographs or images the user is given. If there is a sensor configured to detect an image, sound, an operation history and the like, the sensor detecting a situation leading to the user's action and detecting the action, the robot vacuum cleaner 90 can perform photographing that the user usually performs instead of the user. An intention to photograph a picture of a baby can be directly judged from the user's actions and images that the user has photographed. Photographing of an image that the user does not intend to photograph may be performed as a surprise. Such an image may be presumed from data of the user's family structure, images and sites that the user often sees, information about articles the user purchases.

Therefore, as for teacher data at the time of learning, images that the user is thought to want to photograph (image examples) are collected and set as image pickup results or actions. Each of the image pickup results or actions, and "a situation", "an environment" or the like corresponding to "the image pickup result" or "the action" are paired and learned. The situation or the environment leading to the action can be obtained by analyzing information read from each image, or accompanying information, attached information and related information. That is, a group of images picked up in various situations includes information about the situations and environments in addition to the respective images themselves and makes big data that can be said "photographing tendency information" or "photographing history information". It is possible to provide a new photographing method using a learning method including a step of pairing an example of an image that the user is thought to want to photograph and information accompanying the image into teacher data and a step of obtaining an inference model for inferring a situation that the user wants to photograph by learning, using the teacher data. However, since it is necessary that the robot vacuum cleaner 90 can photograph the image that the user is thought to want to photograph here, it is more practical to select an image that the robot vacuum cleaner 90 is likely to be able to photograph as the above teacher data. For example, by providing a memory in the robot vacuum cleaner 90, storing a map and image data obtained during cleaning, and the robot vacuum cleaner 90 transmitting the data to the information acquisition control apparatus 10 as photographing tendency information, it is possible to further narrow down images that the robot vacuum cleaner 90 (a photographing apparatus) is likely to be able to photograph by referring to the data in the information acquisition control apparatus 10. A result of the narrowing down may be reflected at the time of learning or may be reflected at the time of inference. Due to such devices, it becomes possible to move within a reasonable range and acquire an image that satisfies needs without much trouble. Such an application is also possible that comparing results of consecutive shots with teacher data to select good images. The obtained images may be recorded in the memory in the robot vacuum cleaner 90, wirelessly transmitted to other apparatuses such as the information acquisition control apparatus 10 and other mobile terminals, or transmitted to and recorded in some folder in a server. Of course, if there are home appliances connected to the Internet, various applications such as displaying the images on a TV are conceivable.

Here, simplified steps are shown. Actually, however, there may be a case where waiting photographing is given up from judgment of various situations even though waiting photographing is desirable. That is, there may be a case where a photographing target object moves too fast or a case where a route cannot be searched for because of obstacles. In a case where a route on which an apparatus moves is only the same route as a target object, it should be judged that there is an obstacle in order to avoid an undesirable collision. That is, for example, it is possible to, by effectively using position information that the robot vacuum cleaner 90 has, judge a place from which a specified target object can be easily photographed. For this purpose, it is necessary to judge and decide a route from a positional relationship between a position of the robot vacuum cleaner 90 and a photographing spot and then judge a distance from the route. For this purpose, it is devised that a route other than a route that the moving target object is likely to select is searched for (a plurality of routes are merely searched for, and a target object movement route is deleted from the routes). A procedure of calculating a required time period from a speed of the robot vacuum cleaner 90, judging a speed of the target object from change among a plurality of photographed images and judging the route is included. It is performed in the step to estimate time at which the target object arrives at a position, compare the time with a time period required for the robot vacuum cleaner 90 to arrive and judge whether waiting is possible or not. Though there is a flow in which waiting is given up from a viewpoint of risk avoidance or energy saving as necessary, the flow is omitted here.

FIG. 16 illustrates parallel travel, pursuit and waiting as examples of a photographing method. For example, if the learning server 100 detects that a target object is moving across the image pickup range of the image pickup portion 90a of the robot vacuum cleaner 90, the learning server 100 causes the process to transition to step S91, controls the robot vacuum cleaner 90 to travel in parallel with the target object so that the target object is maintained in the image pickup range and causes the robot vacuum cleaner 90 to start image pickup of the target object. The learning server 100 judges whether image pickup (requested photographing) specified by an information acquisition condition is possible or not. If the image pickup is possible, the learning server 100 causes the robot vacuum cleaner 90 to perform cooperation photographing and transmit a picked up image which is a result of the cooperation photographing to the learning server 100. The learning server 100 records the picked-up image transmitted at step S93.

Now, it is assumed that the waiting mode is specified in the learning server 100. It is also assumed that a target object of waiting is the baby (the user's family member 2) shown under the information acquisition condition in FIG. 14 and is the baby 101 in FIG. 12. In this case, standing, holding on something is specified as an information acquisition condition. At step S54 in FIG. 15, the camera 80 picks up an image of the baby 101. As shown in FIG. 18, it is assumed that the baby 101 enters the image pickup range of the camera 80 in the room interior 61. Then, the learning server 100 performs image analysis of a picked-up image in response to a request from the camera 80 and detects the baby 101 which is a target object. Consequently, the learning server 100 transmits a waiting instruction to the robot vacuum cleaner 90 (step S94). Here, a speed is judged from images repeatedly picked up, and a route is estimated from a movement direction.

The learning server 100 transmits the waiting instruction to the robot vacuum cleaner 90 to cause the robot vacuum cleaner 90 to move to a particular position preferable for image pickup of standing, holding on something specified as an information acquisition condition, for example, a position with a step which has been registered. In FIG. 18, the particular position is a position from which the step part of the sofa 65 can be photographed by the image pickup portion 90a of the robot vacuum cleaner 90. When it becomes possible for the robot vacuum cleaner 90 to pick up an image of standing, holding on something specified by the information acquisition condition (requested photographing), the learning server 100 instructs the robot vacuum cleaner 90 to perform cooperation photographing and causes the robot vacuum cleaner 90 to transmit a picked-up image, which is a result of the cooperation photographing, to the learning server 100 (step S96). The learning server 100 records the picked-up image. Next, at step S97, the learning server 100 returns the robot vacuum cleaner 90 to an original position, and returns the process to step S81.

Note that if it is not possible to pick up an image of the baby 101 standing, holding on something even if a predetermined time period elapses after movement to the particular position, the process may be caused to transition from step S95 to S81. Or, the robot vacuum cleaner 90 may be caused to pick up an image of the baby 101 in a posture other than standing, holding on something and transmit an image pickup result to the learning server 100.

In the case of not selecting parallel travel or waiting as a photographing method at step S90, the learning server 100 selects pursuit. That is, if the robot vacuum cleaner 90 detects a target object within the image pickup range of the image pickup portion 90a, the learning server 100 causes the robot vacuum cleaner 90 to pursue the target object and start image pickup (step S98). If image pickup specified by an information acquisition condition (requested photographing) becomes possible (step S99), the learning server 100 instructs the robot vacuum cleaner 90 to perform cooperation photographing and causes the robot vacuum cleaner 90 to transmit a picked-up image, which is a result of the photographing, to the learning server 100 (step S100). The robot vacuum cleaner 90 transmits the picked-up image to the learning server 100 via communication. The learning server 100 records the received picked-up image.

Thus, in the present embodiment, a learning server generates an information acquisition condition in which an object, a pose, composition and the like that the user wants to pick up an image of are set, based on picked-up images acquired by the user's photographing operations. If a robot vacuum cleaner capable of performing cooperation photographing based on cooperation request communication exists, a camera operated by the learning server or the user transmits the information acquisition condition to the robot vacuum cleaner. The robot vacuum cleaner is capable of performing image pickup while moving, and is capable of pick up an image of an object the user desires in a pose, composition and the like the user desires at a position the user desires. Consequently, even if the user himself/herself is not at a photographing place, or at a place where it is difficult for the user to perform image pickup, it is possible to perform image pickup the user desires.

Note that though an example of a robot vacuum cleaner performing photographing according to a cooperation request from a camera has been described, it is also possible to, when the robot vacuum cleaner picks up an image of a photographing target according to the cooperation request from the camera, give information about a photographing position and direction of the robot vacuum cleaner to the camera via the learning server. In this case, it becomes possible for the camera to recognize a photographing point of the photographing target based on the information from the robot vacuum cleaner, and it becomes possible to support the user picking up an image of an object by an operation of the camera by the user himself/herself.

Note that though an example of performing the inference process and the acquisition control process in the learning server has been described in the above embodiment, the acquisition process, the inference process and the acquisition control process may be performed in any of the apparatuses or may be performed in cooperation among the respective apparatuses as described above. For example, a cloud computer may be used to generate an information acquisition condition.

Though description has been made using a digital camera as an apparatus for image pickup in the above embodiment, the camera may be a digital single-lens reflex camera, a compact digital camera, or a camera for movie such as a video camera or a movie camera. Furthermore, a camera built in a PDA (personal digital assistant) such as a mobile phone or a smartphone is, of course, possible. For example, a machine which does not move itself but only an image pickup portion of which moves like a scanner is also within a range of assumption. For example, for use for observing a microorganism, a microscope or a stage may move. The present application is applicable to use for such scientific observation and is applicable to image pickup apparatuses for picking up an image of not only a part but also a wider range, or a whole, such as a capsule endoscope and a CT scanner. In a case of judging whether pursuit is possible or not from scanning movement and difference in a target object, the technique of the present application can be effectively utilized.

The present invention is not limited to the respective embodiments as they are. At a stage of practicing the present invention, the components can be modified within a range not departing from the spirit of the present invention to embody the present invention. Various inventions can be formed by appropriately combining a plurality of components disclosed in each embodiment. For example, some components among all components shown in each embodiment may be deleted. Furthermore, components among different embodiments may be appropriately combined.

Note that, even if an operation flow in the claims, the specification and the drawings is explained with terms of "first", "next" and the like for convenience, it does not mean that it is essential to perform the operation flow in that order. It goes without saying that, as for each of steps constituting the operation flow, such a part that does not influence essence of the invention can be omitted appropriately.

Note that, among the techniques described here, mainly controls that are illustrated by flowcharts can be set by a program in many cases, and the program may be included in a recording medium or a recording portion. As for how to record the program to the recording medium or the recording portion, the program may be recorded at the time of shipping of the product, a distributed recording medium may be used, or the program may be downloaded via the Internet.

Note that a part described as "a portion" (a section or a unit) may be configured with a dedicated circuit or a combination of a plurality of general-purpose circuits, or may be configured with a processor such as a microcomputer or a CPU that performs an operation according to software programmed in advance or a combination of sequencers such as FPGAs as necessary. Such design is also possible that an external apparatus takes over a part or all of the controls. In this case, a wired or wireless communication circuit intervenes. Communication can be performed through Bluetooth (registered trademark), WiFi or a telephone line or may be performed through USB. Dedicated circuits, general-purpose circuits and controlling portions may be integrated and configured as an ASIC. A moving portion is configured with various actuators, and a coupling mechanism for movement as necessary. The actuators operate by a driver circuit. The drive circuit is also controlled by a microcomputer or an ASIC according to a particular program. Detailed correction, adjustment and the like of the above controls may be performed based on information outputted from various sensors and peripheral circuits of the sensors. Embodiments in which a judgment is made based on a learning result judged by artificial intelligence have been described using terms of an inference model or a learned model. In some cases, simple flow charts, conditional branches or quantification judgment accompanied by operation are substitutable. Especially, by improving arithmetic capacity of control circuits of a camera or by narrowing down to a particular situation or a target object, it becomes possible to do without using a result of machine learning. Even in such cases as above, many of the techniques of the present application can be effectively utilized.

[Supplementary Item 1]

An information acquisition control apparatus including:

a situation detecting portion including a sensor configured to detect a photographing time situation leading to a user's photographing action and detect a photographing result which is a result of the photographing action, and configured to output information about the detected photographing time situation and the detected photographing result;

an inferring portion configured to obtain an inference model by an inference process based on information indicating a relationship between the photographing time situation and the photographing result from the situation detecting portion; and a controlling portion configured to control acquisition of information according to the inference model.

[Supplementary Item 2]

An information acquisition control apparatus including:

a situation detecting portion including a sensor configured to detect a situation leading to a user's action and detect the action, and configured to output information about the detected situation and the detected action;

an inferring portion configured to determine a condition in a case of acquiring information by an inference process based on the information about the detected situation and the detected action from the situation detecting portion and obtain the condition as information about an information acquisition condition; and a controlling portion configured to control acquisition of information according to the information acquisition condition.

[Supplementary Item 3]

The information acquisition control apparatus according to supplementary item 2, wherein the information about the detected situation includes information about a picked-up image photographed by the user's action.

[Supplementary Item 4]

The information acquisition control apparatus according to supplementary item 3, wherein the inferring portion determines the information acquisition condition by image analysis of the picked-up image.

[Supplementary Item 5]

The information acquisition control apparatus according to supplementary item 2, wherein the controlling portion acquires the information by controlling a working robot according to the information acquisition condition.

[Supplementary Item 6]

The information acquisition control apparatus according to supplementary item 2, wherein the detected situation is a photographing position when observation is started;

the detected action is photographing; and the controlling portion performs control so that the working robot performs photographing at a photographing position according to the information acquisition condition when the observation is started.

[Supplementary Item 7]

The information acquisition control apparatus according to supplementary item 3, wherein the detected situation is an image part where image change in the picked-up image is larger than a predetermined threshold;

the detected action is photographing; and the controlling portion performs control so that the working robot picks up an image of the image part where the image change in the picked-up image is larger than the threshold according to the information acquisition condition when the observation is started.

[Supplementary Item 8]

The information acquisition control apparatus according to supplementary item 2, wherein the controlling portion performs control so that the working robot that is moving performs image pickup according to the information acquisition condition.

[Supplementary Item 9]

The information acquisition control apparatus according to supplementary item 2, wherein the controlling portion performs control so that a vacuum cleaning robot that is moving performs image pickup according to the information acquisition condition.

[Supplementary Item 10]

An information acquisition control method including:

a situation detecting step of, using a sensor configured to detect a situation leading to a user's action and detect the action, outputting information about the detected situation and the detected action;

an inferring step of determining a condition in a case of acquiring information by an inference process based on the information about the detected situation and the detected action in the situation detecting step and obtaining the condition as information about an information acquisition condition; and a controlling step of controlling acquisition of information according to the information acquisition condition.

[Supplementary item 11]

An information acquisition control program for causing a computer to execute:

a situation detecting step of, using a sensor configured to detect a situation leading to a user's action and detect the action, outputting information about the detected situation and the detected action;

an inferring step of determining a condition in a case of acquiring information by an inference process based on the information about the detected situation and the detected action in the situation detecting step and obtaining the condition as information about an information acquisition condition; and a controlling step of controlling acquisition of information according to the information acquisition condition.

What is claimed is:

1. A mobile image pickup system in which a mobile image pickup instruction apparatus and a mobile image pickup apparatus acquire an image of an image pickup target in cooperation, wherein
the mobile image pickup instruction apparatus comprises:
a communication device; and a first processor, the first processor
1) receiving historical information including a detected situation and a detected action for each of a plurality of previously recorded images captured responsive to manual user inputs,
2) generating, by applying an inference process to the received historical information, at least one information pickup acquisition condition reflecting a tendency of a user manually photographing a predetermined image pickup target and
3) transmitting the generated at least one information pickup acquisition condition to the mobile image pickup apparatus via the communication device; and
the mobile image pickup apparatus comprises: a mobile body;
an image pickup unit provided on the mobile body; and a second processor, the second processor controlling the mobile body and the image pickup unit to pick up an image of the predetermined image pickup target based on the generated at least one information pickup acquisition condition;
wherein the first processor acquires an inference model by the inference process based on the tendency of a user manually photographing a predetermined image pickup target, and obtains the target object identification information with a current photographing time situation or a future photographing time situation as an input, using the inference model.

2. The mobile image pickup system according to claim 1, wherein the second processor detects the image pickup target by image analysis of a picked-up image of surroundings of the mobile body acquired by the image pickup unit and performs movement control to cause the mobile body to move and image pickup control of the image pickup unit so as to cause an image of the detected image pickup target to be picked up by the image pickup unit.

3. The mobile image pickup system according to claim 1, wherein the at least one information pickup acquisition condition reflecting a tendency of a user manually photographing a predetermined image pickup target is information indicating a relationship between a photographing time situation leading to a user's photographing action and an image pickup result which is a result of the photographing action.

4. The mobile image pickup system according to claim 3, wherein
the mobile image pickup apparatus further comprises a situation detection apparatus comprising a sensor configured to detect the photographing time situation and the image pickup result and a third processor; and
the third processor gives information about the detected photographing time situation and the detected image pickup result to the first processor via the communication device.

5. The mobile image pickup system of claim 1 wherein the historical information further includes detected sounds associated with the plurality of previously recorded images.

6. The mobile image pickup system of claim 5, wherein the tendency of a user manually photographing a predetermined image pickup target is information indicating a relationship between a photographing time situation leading to a user's photographing action and an image pickup result which is a result of the photographing action, and
wherein the mobile image pickup apparatus further includes (1) a situation detection apparatus comprising a sensor configured to detect the photographing time situation and the image pickup result and (2) a third processor, the third processor providing information about the detected photographing time situation and the detected image pickup result to the first processor via the communication device.

7. The mobile image pickup system of claim 1 wherein the predetermined image pickup target includes a cell provided on a culture medium, and
wherein the mobile image pickup apparatus is a camera drivable in two directions on a plane parallel to the culture medium.

8. The mobile image pickup system according to claim 1, wherein the mobile image pickup apparatus obtains images using at least one of (A) ultraviolet rays, (B) infrared rays, (C) X rays, (D) refraction, (E) sound waves, and (F) ultrasound waves.

9. The mobile image pickup system according to claim 1, wherein the generated at least one information pickup acquisition condition includes target object identification information.

10. A mobile image pickup apparatus comprising:
an image pickup unit provided on a mobile body; a communication device configured to perform communication with an external mobile image pickup instruction apparatus; and a processor, wherein
the processor (1) provides to the external mobile image pickup instruction apparatus via the communication device, historical information including a detected situation and a detected action for each a plurality of previously recorded images captured by the image pickup unit responsive to manual user inputs, (2) receives
from the external mobile image pickup instruction apparatus, at least one information pickup acquisition condition reflecting a tendency of a user manually photographing of a predetermined image pickup target, wherein the at least one information pickup acquisition condition was generated by applying an inference process to the historical information provided to the external mobile image pickup instruction apparatus, and (3) performs, using the at least one information pickup acquisition condition, movement control to cause the mobile body to move using map information so as to cause an image of an image pickup target to be picked up by the image pickup unit and image pickup control to cause the image of the image pickup target to be picked up by the image pickup unit, and wherein the tendency of a user manually photographing a predetermined image pickup target shows a tendency of photographing of the predetermined image pickup target and is obtained by judgment of an image pickup result and an image pickup condition;

wherein the first processor acquires an inference model by the inference process based on the tendency of a user manually photographing a predetermined image pickup target, and obtains the target object identification information with a current photographing time situation or a future photographing time situation as an input, using the inference model.

11. The mobile image pickup apparatus according to claim 10, wherein the processor transmits a picked-up image of the image pickup target picked up by the image pickup unit to the mobile image pickup instruction apparatus by the communication device.

12. The mobile image pickup apparatus according to claim 10, wherein the processor transmits a picked-up image of the image pickup target picked up by the image pickup unit to an apparatus other than the mobile image pickup instruction apparatus by the communication device.

13. The mobile image pickup apparatus according to claim 10, wherein the processor transmits information about a picked-up image that can be acquired by the image pickup unit to the mobile image pickup instruction apparatus as the tendency of a user manually photographing a predetermined image pickup target.

14. An information acquisition control method comprising steps of:
a) receiving historical information including a detected situation and a detected action for each of a plurality of previously recorded images captured responsive to manual user inputs;
b) generating, by applying an inference process to the received historical information, at least one information pickup acquisition condition reflecting a tendency of photographing a predetermined image pickup target;
c) transmitting the generated at least one information pickup acquisition condition to a mobile image pickup apparatus, the mobile image pickup apparatus having (1) a mobile body, and (2) an image pickup unit; and
d) controlling the mobile body and the image pickup unit to pick up an image of the predetermined image pickup target based on the generated at least one information pickup acquisition condition;

wherein the first processor acquires an inference model by the inference process based on the tendency of a user manually photographing a predetermined image pickup target, and obtains the target object identification information with a current photographing time situation or a future photographing time situation as an input, using the inference model.

15. A non-transitory computer-readable recording medium in which an information acquisition control program is stored, the information acquisition control program causing a computer to execute a procedure for:
a) receiving historical information including a detected situation and a detected action for each of a plurality of previously recorded images captured responsive to manual user inputs;
b) generating, by applying an inference process to the received historical information, at least one information pickup acquisition condition reflecting a tendency of photographing a predetermined image pickup target;
c) transmitting the generated at least one information pickup acquisition condition to a mobile image pickup apparatus, the mobile image pickup apparatus having (1) a mobile body, and (2) an image pickup unit; and d) controlling the mobile body and the image pickup unit to pick up an image of the predetermined image pickup target based on the generated at least one information pickup acquisition condition;

wherein the first processor acquires an inference model by the inference process based on the tendency of a user manually photographing a predetermined image pickup target, and obtains the target object identification information with a current photographing time situation or a future photographing time situation as an input, using the inference model.

* * * * *